US009864483B2

(12) United States Patent
Sarrazin et al.

(10) Patent No.: US 9,864,483 B2
(45) Date of Patent: Jan. 9, 2018

(54) METHODS AND APPARATUS FOR THE MANAGEMENT AND VIEWING OF CALENDAR EVENT INFORMATION

(75) Inventors: Jacou Sarrazin, Repentigny (CA); Vitaliy Igorevych Belitsky, Montreal (CA)

(73) Assignee: BlackBerry Limited, Waterloo (CA)

( * ) Notice: Subject to any disclaimer, the term of this patent is extended or adjusted under 35 U.S.C. 154(b) by 342 days.

(21) Appl. No.: 14/396,913

(22) PCT Filed: Apr. 26, 2012

(86) PCT No.: PCT/CA2012/050264
§ 371 (c)(1),
(2), (4) Date: Oct. 24, 2014

(87) PCT Pub. No.: WO2013/159173
PCT Pub. Date: Oct. 31, 2013

(65) Prior Publication Data
US 2015/0143303 A1    May 21, 2015

(51) Int. Cl.
G06F 3/00       (2006.01)
G06F 3/0482    (2013.01)
G06Q 10/10     (2012.01)
G06F 3/0485    (2013.01)
G06F 3/0484    (2013.01)
G06F 3/01       (2006.01)

(52) U.S. Cl.
CPC .......... *G06F 3/0482* (2013.01); *G06F 3/0485* (2013.01); *G06F 3/04847* (2013.01); *G06Q 10/109* (2013.01); *G06Q 10/1095* (2013.01)

(58) Field of Classification Search
None
See application file for complete search history.

(56) References Cited

U.S. PATENT DOCUMENTS 5,023,851 A      6/1991  Murray et al.
7,188,073 B1 *   3/2007  Tam ..................... G06Q 10/02
                                                                  705/5

(Continued)

OTHER PUBLICATIONS

Okie Eko Wardoyo: "Media Tutorial—Webdeveloper Tool—Beyond Compare:flv", May 30, 2011 (May 30, 2011), XP054975797, Retrieved from the Internet: URL:https://www.youtube.com/watch?v=jzgB2KH1C3g [retrieved on Mar. 23, 2015].

(Continued)

*Primary Examiner* — Toan Vu
(74) *Attorney, Agent, or Firm* — Borden Ladner Gervais LLP; Todd Keeler

(57)  ABSTRACT

The present document describes methods and apparatuses for managing and viewing calendar event items in an electronic calendaring application. For example, calendar event items may be viewed in an "agenda" view. A calendar event item may have a date and include any information relating to a corresponding calendar event. According to some example embodiments, a list of calendar event items and a list of dates are each displayed in a navigable format. The list of dates may include at least dates in a date range defined by the dates of the calendar event items. A navigation position of the list of calendar event items and a navigation position of the list of dates may be coordinated.

23 Claims, 17 Drawing Sheets

(56) References Cited

U.S. PATENT DOCUMENTS

| | | | |
|---|---|---|---|
| 7,757,181 B2 | 7/2010 | Pan et al. | |
| 2005/0216842 A1* | 9/2005 | Keohane | G06Q 10/1095 |
| | | | 715/733 |
| 2006/0010098 A1* | 1/2006 | Goodnow | G06F 19/322 |
| 2007/0168892 A1* | 7/2007 | Brush | G06Q 10/109 |
| | | | 715/751 |
| 2007/0260503 A1* | 11/2007 | Pan | G06Q 10/109 |
| | | | 715/772 |
| 2008/0040188 A1* | 2/2008 | Klausmeier | G06Q 10/109 |
| | | | 705/7.18 |
| 2008/0082925 A1* | 4/2008 | Brush | G06Q 10/1093 |
| | | | 715/744 |
| 2008/0141145 A1* | 6/2008 | Klausmeier | G06Q 10/109 |
| | | | 715/751 |
| 2008/0201647 A1* | 8/2008 | Lagerstedt | G01W 1/02 |
| | | | 715/748 |
| 2008/0294994 A1* | 11/2008 | Kruger | G06Q 10/109 |
| | | | 715/733 |
| 2009/0164252 A1* | 6/2009 | Morris | G06Q 10/00 |
| | | | 705/3 |
| 2010/0275148 A1 | 10/2010 | Pan et al. | |
| 2011/0205370 A1 | 8/2011 | Griffin et al. | |
| 2012/0197523 A1* | 8/2012 | Kirsch | G01C 21/362 |
| | | | 701/426 |
| 2013/0036369 A1* | 2/2013 | Mitchell | G06Q 50/00 |
| | | | 715/753 |
| 2013/0179209 A1* | 7/2013 | Milosevich | G06Q 10/06 |
| | | | 705/7.18 |
| 2013/0305160 A1* | 11/2013 | Gingras | G06Q 10/109 |
| | | | 715/738 |
| 2014/0075366 A1* | 3/2014 | Reyes | G06F 3/0482 |
| | | | 715/772 |

OTHER PUBLICATIONS

PocketPC.ch: "Windows Phone 7 Kalender und Erinnerung", Aug. 7, 2010 (Aug. 7, 2010), XP054975798, Retrieved from the Internet: URL:https//www:youtube:.com/watch?v=DSoEhHV5BFU [retrieved on Mar. 24, 2015].

Extended European Search Report dated Apr. 1, 2015, issued in respect of corresponding European Patent Application No. 12875487.6.

Picture of MS 3.0 agenda view retrieved from <http://www.smartphoneforums.com/forums/attachments/samsung-i900-omnia/13548d1240972885-spb-mobile-shell-3-0-awsome-20090428-ms3-professional-home-.png> on Apr. 14, 2012.

Print out of <http://www.wpcentral.com/review-spb-mobile-shell-30> posted on May 7, 2009.

Printout of two screenshots of Google Calendar, taken on Apr. 26, 2012.

Network Working Group, RFC 5545, "Internet Calendaring and Scheduling Core Object Specification (iCalendar)", Sep. 2009.

Network Working Group, RFC 2445, "Internet Calendaring and Scheduling Core Object Specification (iCalendar)", Nov. 1998.

International Search Report for International Application No. PCT/CA2012/050264, dated Jul. 20, 2012.

European Patent Application No. 12875487.6, Office Action dated Mar. 27, 2017.

\* cited by examiner

METHODS AND APPARATUS FOR THE MANAGEMENT AND VIEWING OF CALENDAR EVENT INFORMATION

RELATED APPLICATION

The present application is a national phase entry of International PCT Application No. CA/2012/050264 filed Apr. 26, 2012, the entire content of which is incorporated herein by reference.

FIELD

The subject matter disclosed herein generally relates to the field of electronic calendars and time management.

BACKGROUND

Conventional electronic calendaring applications may provide calendar views that allow a user to view calendar information for dates in a certain date range. For example, a "week" view or a "month" view may be provided. Conventional electronic calendaring applications may also allow a user to view information concerning calendar events such as appointments, meetings, telephone conferences, etc., in the form of an agenda. The agenda may include information concerning calendar events that occur over a date range. Conventional electronic calendars may allow navigation through items listed in an agenda.

Conventional mobile communication devices have displays that may be relatively small in comparison with the displays of desktop or laptop computers. Therefore, user interface regions of mobile communication devices (such as a touch screen) may have relatively limited space for displaying information and receiving input from a user. Therefore, managing large amounts of information displayed on a mobile device, such as information relating to several different calendar events, may be difficult.

SUMMARY

According to another aspect of the present invention, there is provided a method implemented by a processor including: displaying a list of calendar event items in a navigable format such that, at least a portion of the list of calendar event items is displayed as a function of a navigation position of the list of calendar event items, each calendar event item having a date; displaying a list of dates in a navigable format such that at least a portion of the list of dates and a date marker drawing attention to one of the dates in the at least a portion of the list of dates are displayed as a function of a navigation position of the list of dates, the list of dates including at least dates in a date range defined by the dates of the calendar event items: coordinating the navigation position of the list of calendar event items and the navigation position of the list of dates by: adjusting the navigation position of the list of calendar event items responsive to navigating the list of dates; and adjusting the navigation position of the list of dates responsive to navigating the list of calendar event items.

In some example embodiments, the method further comprises: from calendar data including, for each of at least one calendar events, respective data items, generating at least one of: the list of calendar event items, each calendar event item corresponding to a respective one of said at least one calendar event; and the list of dates.

In some example embodiments, navigating the list of calendar event items comprises at least one of scrolling the list of calendar event items and swiping the list of calendar event items.

In some example embodiments, navigating the list of dates comprises at least one of scrolling the list of dates and swiping the list of dates.

In some example embodiments, each calendar event item in the displayed at least a portion of the list of calendar event items has a same date.

In some example embodiments, coordinating the navigation position of the list of calendar event items and the navigation position of the list of dates comprises coordinating the navigation position of the list of calendar event items and the navigation position of the list of dates such that the date designated by the date marker is an earliest one of the dates of calendar event items in the displayed at least a portion of the list of calendar event items.

In some example embodiments, displaying the list of dates in a navigable format comprises displaying the at least a portion of the list of dates above the displayed at least a portion of the list of calendar event items.

In some example embodiments, the method further comprises, if the navigation position of the list of calendar event items exceeds a threshold position for the list of calendar event items, generating at least one additional calendar event item from the calendar data and adding the additional at least one calendar event item to the list of calendar event items.

In some example embodiments, the method further comprises adjusting the threshold position of the list of calendar event items.

In some example embodiments, the method further comprises, if the navigation position of the list of dates exceeds a threshold position for the list of dates, generating at least one additional calendar event item from the calendar data and adding the additional at least one calendar event item to the list of calendar event items.

In some example embodiments, the method further comprises adjusting the threshold position of the list of dates.

In some example embodiments, the method further comprises adding at least one date to the list of dates as a function of the additional at least one calendar event item.

In some example embodiments, the method further comprises, for each date in the displayed at least a portion of the list of dates, displaying a visual indicator as a function of the calendar data, the calendar data further including, for each of the at least one calendar event, a respective data item indicating a total time occupied by the event.

In some example embodiments, the visual indicator comprises, for each date, at least one of: a respective font setting of a respective numerical day, the font setting being determined as a function of the calendar data; and an animation.

In some example embodiments, adjusting the navigation position of the list of dates responsive to navigating the list of calendar event items comprises displaying an animation of a transition of the displayed at least a portion of the list of dates from a pre-adjusted state to a post-adjusted state.

According to another aspect of the present invention, there is provided an apparatus including: a display; an input device; a processor configured to control the display to display: a list of calendar event items in a navigable format such that, at least a portion of the list of calendar event items is displayed as a function of a navigation position of the list of calendar event items, each calendar event item having a date; and a list of dates in a navigable format such that at least a portion of the list of dates and a date marker drawing attention to one of the dates in the at least a portion of the list of dates are displayed as a function of a navigation position of the list of dates, the list of dates including at least dates in a date range defined by the dates of the calendar event items; and the processor further configured to coordinate the navigation position of the list of calendar event items and the navigation position of the list of dates by: adjusting the navigation position of the list of calendar event items responsive to navigating the list of dates; and adjusting the navigation position of the list of dates responsive to navigating the list of calendar event items.

In some example embodiments, the apparatus further comprises the processor configured to generate, from calendar data including respective data items for each of at least one calendar events, at least one of: the list of calendar event items, each calendar event item corresponding to a respective one of said at least one calendar event; and the list of dates.

In some example embodiments, the processor coordinates the navigation position of the list of calendar event items and the navigation position of the list of dates such that the date designated by the date marker is an earliest one of the dates of calendar event items in the displayed at least a portion of the list of calendar event items.

In some example embodiments, the navigable format of the list of dates is at least one of a scrolling format and a swiping format.

In some example embodiments, the navigable format of the list of calendar event items is at least one of a scrolling format and a swiping format.

In some example embodiments, the apparatus further comprises the processor further configured to generate an animation of a transition of the displayed at least a portion of the list of dates from a pre-adjusted state to a post-adjusted state.

In some example embodiments, if the navigation position of the list of calendar event items exceeds a threshold position for the list of calendar event items, the list generator generates at least one additional calendar event item from the calendar data and adds the additional at least one calendar event item to the list of calendar event items.

In some example embodiments, if the navigation position of the list of dates exceeds a threshold position for the list of dates, the list generator generates at least one additional calendar event item from the calendar data and adds the additional at least one calendar event item to the list of calendar event items.

In some example embodiments, the apparatus further comprises a processor configured to, for each date in the displayed at least a portion of the list of dates, generate a visual indicator as a function of calendar data, the calendar data including, for each of at least one calendar event: at least respective data items indicating a date for the calendar event and a total time occupied by the event.

According to another aspect of the present invention, there is provided an apparatus including: a display; an input device; a processor; and a memory having computer-executable instructions stored thereon that, when executed by the processor, cause the processor to implement a method including: displaying a list of calendar event items in a navigable format such that, at least a portion of the list of calendar event items is displayed as a function of a navigation position of the list of calendar event items, each calendar event item having a date; displaying a list of dates in a navigable format such that at least a portion of the list of dates and a date marker drawing attention to one of the dates in the at least a portion of the list of dates are displayed as a function of a navigation position of the list of dates, the list of dates including at least dates in a date range defined by the dates of the calendar event items: coordinating the navigation position of the list of calendar event items and the navigation position of the list of dates by: adjusting the navigation position of the list of calendar event items responsive to navigating the list of dates; and adjusting the navigation position of the list of dates responsive to navigating the list of calendar event items.

Other aspects and features of the present disclosure will become apparent, to those ordinarily skilled in the art, upon review of the following description of some specific example embodiments. As will be realized, the subject matter disclosed and claimed is capable of modifications in various respects, all without departing from the scope of the claims. Accordingly, the drawings and the description are to be regarded as illustrative in nature, and not as restrictive.

BRIEF DESCRIPTION OF THE DRAWINGS

Some example embodiments will now be described in greater detail with reference to the accompanying diagrams, in which.

DETAILED DESCRIPTION

Conventional calendaring applications may provide a "week" view layout (or other similar views for a date range). Typically, a "week" view may show dates from a given Sunday to the next Saturday (or for a given Monday to the next Sunday) as a point of reference for the information concerning calendar events that is displayed. As also noted above, an electronic calendaring application may provide an "agenda" view or, a similar view, in which information regarding one or more calendar events is displayed in a list according to date. In a conventional "agenda" view, the points of reference for different dates may no longer be present. These points of reference may typically be replaced by a label that describes the day being currently viewed in the agenda view. As a user may navigate days in an agenda view, but the user may lose track of what part of the week and/or what date they are looking at. This loss of orientation may reduce the productivity of the conventional agenda view. Some example embodiments described herein may merge the usability of a week view within the agenda view.

Figure 1:
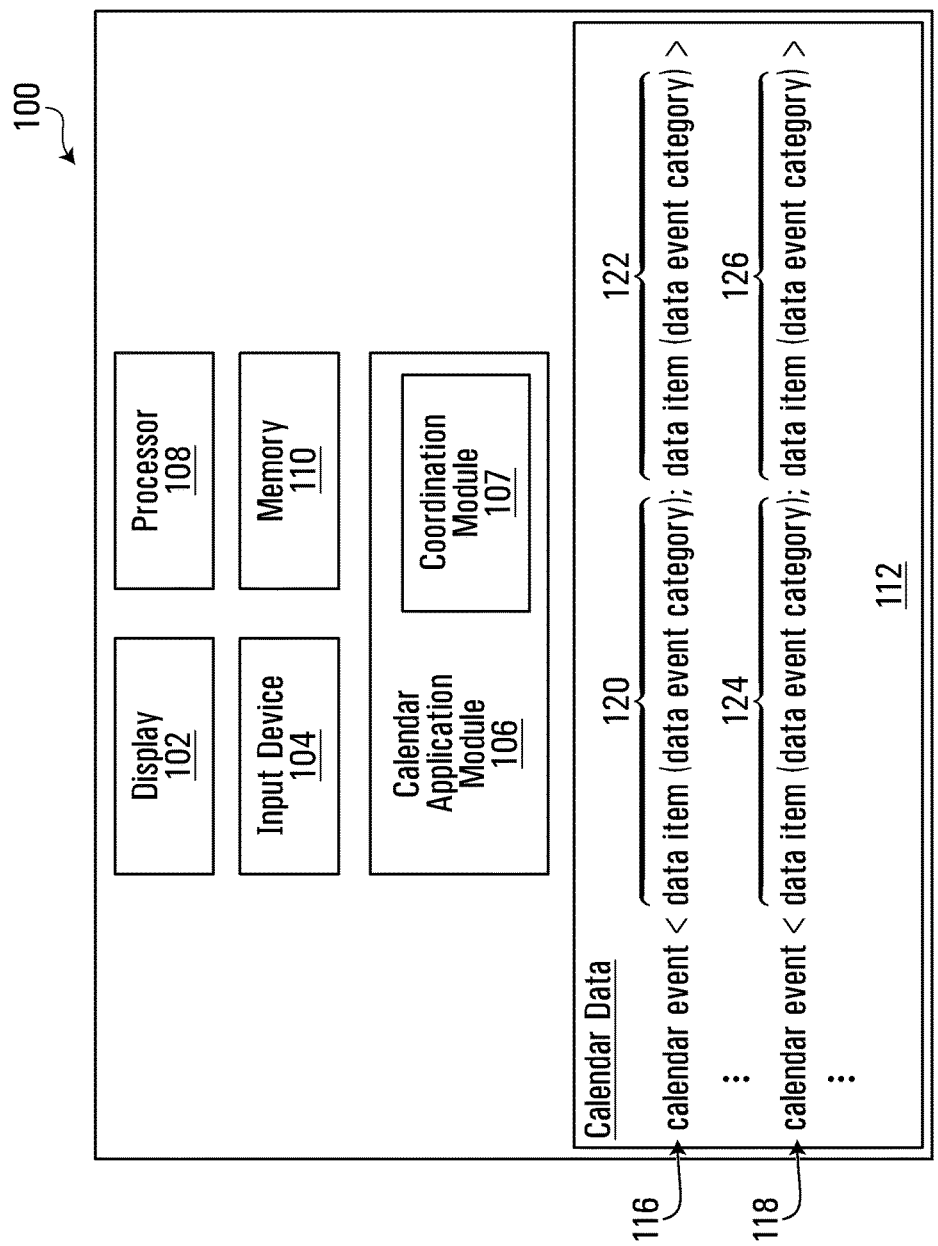
FIG. 1 is a block diagram of an example apparatus for managing and viewing calendar information according to some example embodiments.

FIG. 1 is a block diagram of an example apparatus 100 for managing and viewing calendar information according to some example embodiments. The apparatus 100 includes a display 102, an input device 104, a calendar application module 106, a processor 108 and a memory 110. The calendar application module 106 may utilize calendar data stored at the apparatus. By way of example, the apparatus 100 is shown as having access to calendar data 112 stored at the apparatus 100. However, example embodiments are not limited to the calendar data 112 being stored at the apparatus 100. For example, calendar data 112 may be stored at a network component (such as a server), and the apparatus 100 may receive the calendar data 112 (or other data generated from the calendar data 112) from the network component as necessary.

Calendar data, such as the calendar data 112 shown in FIG. 1, may include data for a plurality of calendar events. Calendar events are any scheduled occurrence, either future or past. Examples of calendar events include, for example, meetings, appointments, phone, video or internet conferences, etc. Each calendar event is defined by a number of data items. Each data item defines a characteristic of the respective event. The data items defining a given calendar event may include the type of the meeting (e.g. physical meeting, online meeting, video conference, phone conference, lunch, coffee break etc.); an identification of the person(s)/participant(s) associated with the event; a duration of the event; date of the event; start and/or end times; meeting notes; and a location of the event, to name a few examples. Example embodiments are not limited to these examples of data items, and any information relating to calendar events may be stored in calendar data.

The calendar data may be classified or organized according to a plurality of event data categories. Accordingly, each data item in calendar data may be a data item of one of the calendar events classified into one of the event data categories. A data item classified into an event data category is said to correspond to that event data category. Event data categories define categories of event characteristics. In some example embodiments, event data categories include: meeting type data; participant(s) data; date data; duration data; and location data. Any other characteristics of a calendar event may also be used as an event data category. In some example embodiments, a user may define the event data categories to be included in the calendar data.

As mentioned above, each data item in calendar data may be a data item of one of the calendar events classified into one of the event data categories. For example, if one event data category is meeting type data, then a corresponding data item for each calendar event defines the type of meeting for that event. For example, the corresponding data item for a first event may be "personal", while the corresponding data item for a second event may be "business". Other meeting types may include "external", "internal", "lunch", "phone conference" etc. As another example, data items corresponding to the "participant" event data category may identify the specific participants expected to participate in the respective calendar events. In the illustrated example of FIG. 1, the calendar data 112 includes data items 120 and 122 for a first calendar event 116 and data items 124 and 126 for a second calendar event 118, and each data item is categorized according to a respective event data category. However, it should be clearly appreciated that the specific form and content of calendar data may vary, and example embodiments are not limited to any of the particular event data categories listed above. In some example embodiments, the event data categories under which the data items are organized may include categories of data not specifically identified herein.

The calendar data, in some example embodiments, may be classified and stored according to Internet Calendaring and Scheduling Core Object Specification (iCalendar) RFC 5545 and RFC 2445 standards. The entire contents of the RFC 5545 and RFC 2445 standards are incorporated herein by reference. These standards dictate, among other things, how to accept meetings, invite others, etc.

As used herein, the term "calendar event item" means any data for display that contains information about a calendar event. In particular, a given calendar event item, like calendar data for a given calendar event, may be defined by at least one data item containing information relating to that event. For example, a calendar event item may include data that indicates at least one of: a date, a name, a location, at least one participant, a start time, an end time, a duration, an event type, etc. Any information relating to calendar events that may be generated from calendar data may be included in the calendar event items. Calendar event items may be generated from calendar data as described below. The calendar event items may be agenda items for viewing in an "agenda" view.

The apparatus 100 may be a client device or a network component. The term "client device" includes, but is not limited to, personal computing devices, user terminals, and other similar computing devices. A client device may also be a mobile communication device. A client device may communicate with a network component. The client device may also communicate with a different computing device (such as a desktop or laptop computer, for example) that, in turn, communicates with the network component. For example, the client device may be "synchronized" with a computer. Synchronizing may include sending data to the computer and/or receiving data from the computer, such that the mobile communication device and the computer share data.

The term "network component" includes such components as a server and/or an access node. The term access node may refer to a base station (BS), a base node, an evolved base node (eNB), a relay node, or other comparable wireless network radio receiver/transmitter components. In some example embodiments, there may be multiple network components in communication.

The function of the calendar application module 106 will now be described. The calendar application module 106 controls the display 102 of the apparatus 100 to display a list of calendar event items in a navigable format. The calendar application module 106 also controls the display 102 to display a list of dates in a navigable format. Examples of how the list of calendar event items and the list of dates may be displayed in a navigable format are discussed below. The input device 104 may receive input to navigate the list of calendar event items. The input device 104 may receive input to navigate the list of dates. For example, the input device 104 may receive input from a user of the apparatus 100. In some example embodiments, the input device 104 and the display 102 may both be implemented using a same component, such as a touch screen. In other example embodiments, the input device 104 may be separate from the display 102. For example, the input device 104 may include one or more of the following: a keyboard, a touch pad, a scroll wheel, a computer mouse, a trackball, or other similar devices.

The calendar application module 106 in this example includes coordination module 107. The coordination module 107 coordinates the navigation position of the list of calendar event items and the navigation position of the list of dates by: adjusting the navigation position of the list of calendar event items responsive to navigating the list of dates; and adjusting the navigation position of the list of dates responsive to navigating the list of calendar event items. Although the coordination module 107 is shown as part of the calendar application module 106 in this example, in some example embodiments, the coordination module 107 is separate from the calendar application module 106.

The calendar application module 106 and the coordination module 107 may be implemented as a processor (such as the processor 108) configured to coordinate the list of calendar event items and the list of dates as described above. The calendar application module 106 and the coordination module 107 may be implemented as a memory (such as the memory 110) containing instructions for execution by a processor (such as the processor 108) that, when executed, cause the processor to implement the method of FIG. 1 or any of the other example methods described herein. The calendar application module 106 and the coordination module 107 may also be implemented by additional hardware, or by a combination of instructions stored in a memory and additional hardware, to name a few examples.

The apparatus 100 may also include additional components not shown such as a receiver and/or a transmitter.

A method for managing and viewing calendar information will be discussed with reference to FIG. 2.

Figure 2:
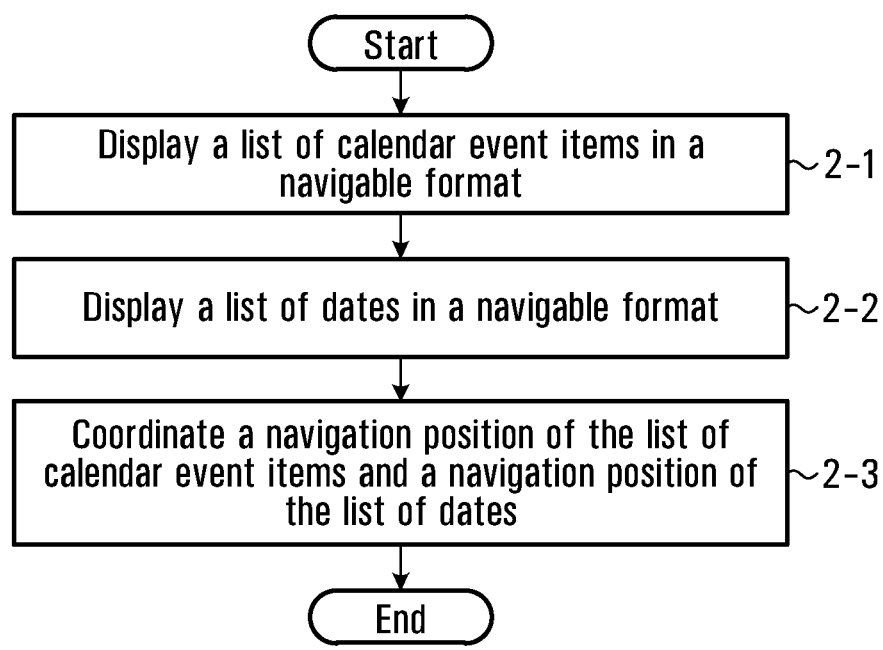
FIG. 2 is a block diagram of an example method for managing and viewing calendar information according to some example embodiments.

FIG. 2 is a flowchart of a method for managing and viewing calendar information according to some example embodiments. The method shown in FIG. 2 may be performed by an apparatus and may be implemented with the use of one or more processors.

At block 2-1, a list of calendar event items is displayed in a navigable format such that at least a portion of the list of calendar event items is displayed as a function of a navigation position of the list of calendar event items. Each calendar event item has a date. In this example, the list of calendar event items is organized according to the dates of the calendar event items. The navigable format may be a scrolling or a swiping format. However, other methods of navigating a list of calendar event items may also be used. Example embodiments are not limited to any particular method of navigating the list of calendar event items.

At block 2-2 of FIG. 2, a list of dates is displayed in a navigable format such that at least a portion of the list of dates and a date marker drawing attention to one of the dates in the at least a portion of the list of dates are displayed as a function of a navigation position of the list of dates. (Examples of the at least a portion of the list of dates are shown at date areas 502 of FIGS. 5A and 5B, 602 of FIGS. 6A and 6B, and 702 of FIG. 7. Examples of such a date marker are shown at 518 of FIGS. 5A and 5B and at 618 of FIGS. 6A and 6B.) The list of dates may include at least dates in a range defined by the dates of the calendar event items in the list of calendar event items. At least a portion of the list of dates may be displayed as a sequence of numbers, where each number is a numerical day of the month corresponding to one of the dates in the list of dates.

The navigable format may be a scrolling or a swiping format. However, other methods of navigating a list of dates (such as clicking on specific dates) may also be used. The date marker may be any graphical indication of a date among the displayed portion of the list of dates. For example, the date marker may be set to draw attention to or designate a date of one or more of the calendar event items that are displayed. If the displayed portion of the list of calendar event items includes calendar event items having more than one date, the date marker may draw attention to one of the multiple dates (for example, the earliest date of any displayed calendar event item).

Before describing block 2-3 of FIG. 2, an example of a navigable list of calendar event items and an example of a navigable list of dates will be described with reference to FIGS. 3 and 4.

Figure 3:
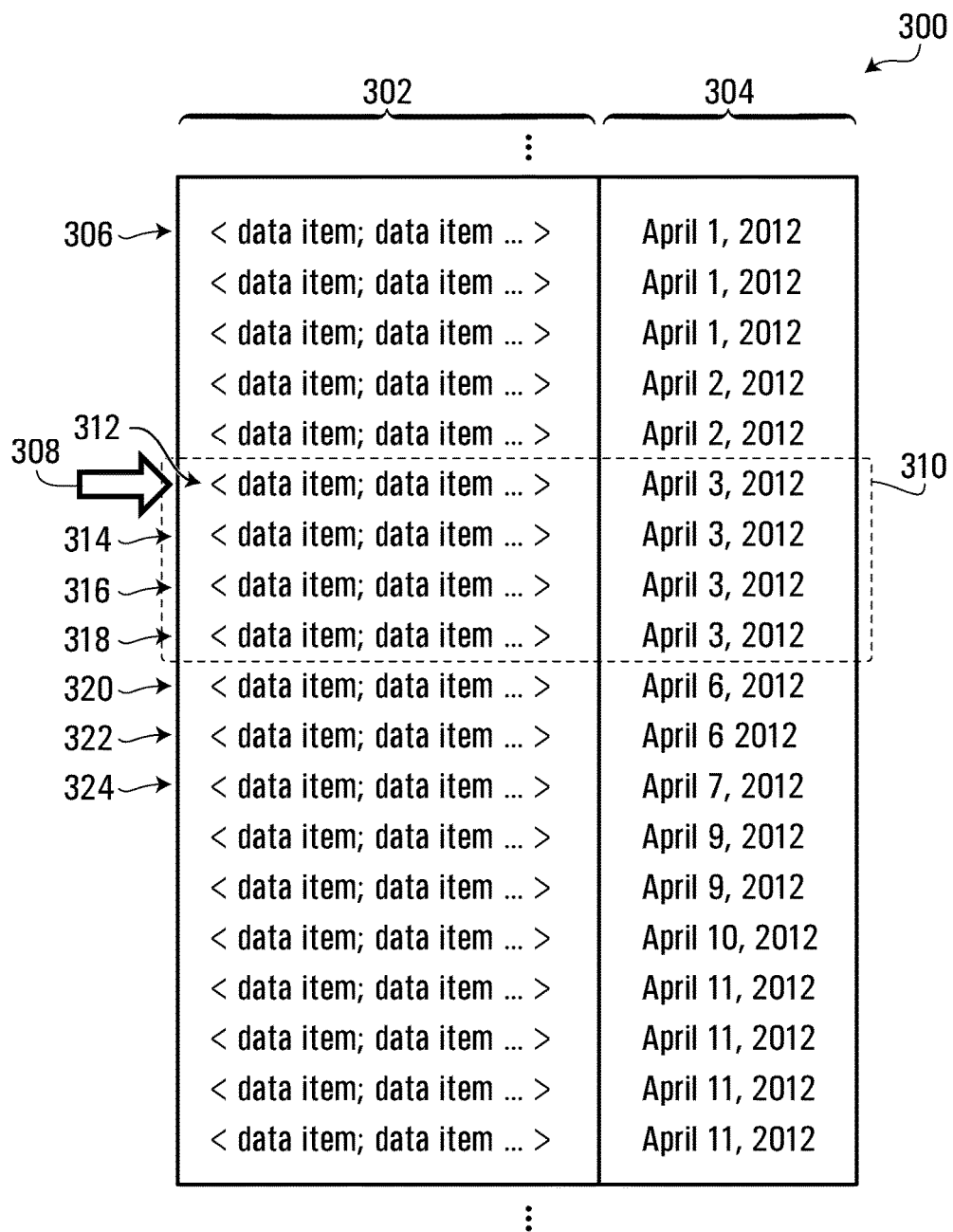
FIG. 3 shows an example list of calendar event items.

FIG. 3 shows an example of a navigable list 300 of calendar event items. Each row corresponds to a respective calendar event item. Each calendar event item in this example includes data items (shown in the column 302) and a respective date (shown in column 304). For example, calendar event item 306, having data items and a date of Apr. 1, 2012, is shown at the top of the list 300. As described above, calendar event items may each include one or more respective data items. However, it is to be understood that no particular content of the calendar event items is required.

A navigation position 308 and a displayed portion 310 of the list of calendar even items are shown in FIG. 3. The displayed portion 310 may be displayed on a display of an apparatus, such as the apparatus 100 shown in FIG. 1. The displayed portion 310 of the list of calendar event items is determined as a function of the navigation position, as will be described below.

The term "navigation position" is used herein to refer to a movable reference point in the list. In the example of FIG. 3, the current navigation position 308 is indicated by an arrow, but it is to be understood that the navigation position 308 is a movable reference point in the list 300. The navigation position of the list of calendar event items may be moved within the list as a function of received user input. (For example, a user may touch a particular place on the display 102 of apparatus 100 of FIG. 1 and the user's touch may set the navigation position to be at the particular place on the display.) In some example embodiments, if the navigation position is located at a given calendar event item in the list, then the portion of the list that is displayed includes at least the given calendar event item and may also include one or more additional calendar event items adjacent to the given calendar event item. The portion of the list that is displayed may be limited to a maximum number of calendar event items that may be displayed. For example, the maximum number of calendar event items that may be displayed may be five or ten. In some example embodiments, the maximum number of calendar event items that may be displayed may be determined based on a total amount of display space available to display the portion of the list of calendar event items. Some calendar event items may require more space than others.

By way of example, the navigation position 308 in FIG. 3 is shown as being at calendar event item 312. The portion 310 of the list 300 that is displayed as a function of the navigation position 308 is indicated by a stippled line box in FIG. 3. The displayed portion 310 of the list of calendar event items, in this example, includes only calendar event items having a same date, although this is not the case in other embodiments, as will be discussed below. For example, in some example embodiments, the displayed portion could include calendar event items from multiple dates. In this example the navigation position 308 is at calendar event item 312, which has a date of Apr. 3, 2012. Each of the calendar event items 314, 316 and 318, which have the same date, are included in the displayed portion 310 of the list 300.

As noted above, a navigation position (such as the navigation position 308 in FIG. 3) may be moved in the list of calendar event items responsive to user input. For example, a user may activate a navigation function (such as scrolling or swiping the list) that moves the navigation position in the list. The navigation position may be moved either upward or downward in the list. In some example embodiments, the navigation position may be navigated to any of the calendar event items in the list of calendar event items. In other example embodiments, the navigation position is limited to a set of calendar event items, where each member of the set is the first calendar event item having a respective date. Example embodiments are not limited to a particular navigation format. Any suitable method of navigating through items in a list may be used for displaying the list of calendar event items in a navigable format. When the navigation position moves, the displayed portion of the list of calendar event items may be updated accordingly.

In the example of FIG. 3, the navigation position may be moved to any of the items in the list 300, but the displayed portion 310 of the list is limited to calendar event items having the same date. For example, if the navigation position 308 is moved to either of calendar event item 320 or calendar event item 322 (which both have the date Apr. 6, 2012), then the displayed portion 310 will include calendar event items 320 and 322. Alternatively, if the navigation position 308 is moved to calendar event item 324 shown in FIG. 3, then the displayed portion 310 may include only calendar event item 324 (which has the date Apr. 7, 2012), because no other calendar event items in the list 300 have Apr. 7, 2012, for a date. On the other hand, in this example, if the navigation position 308 moves from the calendar event item 312 to the calendar event item 314, the displayed portion 310 of the list 300 may not change because the date of the event 314 is the same as the date for the event 312. In other embodiments, the displayed portion of the list of calendar event items is not limited to calendar event items having the same date.

In some example embodiments, the displayed portion of the list of calendar event items may always change if the navigation position changes. For example, the displayed portion of the list may always be set so that the calendar item designated by the navigation position is always displayed as the first item (i.e. at the top of the displayed portion). Example embodiments are not limited to any particular correlation between the navigation position of the list of calendar event items and the displayed portion of the list of calendar event items.

The navigation format of the list of calendar event items may be a scrollable format (e.g. vertical scrolling through the list of calendar event items), a swiping format (e.g. horizontal swiping through groups of one or more calendar event items at a time), or any other suitable format of navigation (e.g. gestures, buttons, voice commands, etc). Some example embodiments are described herein as displaying the list of calendar event items in either a swiping or scrollable format. However, example embodiments are not limited to these navigation formats.

Navigating the list may include navigating by one item at a time (for example by scrolling the list). Navigating the list of calendar event items may also include navigating by groups of items at a time. For example, navigating the list of calendar event items may move the navigation position to a calendar event having the closest date either before or after the current navigation position. As a more specific example, a user may scroll up or down or swipe left or right in a list of calendar event items to navigate the list from a first set of calendar event items having a first date to a second set of calendar event items having a second date. Navigating may also include receiving a selection of a particular calendar event item.

Figure 4:
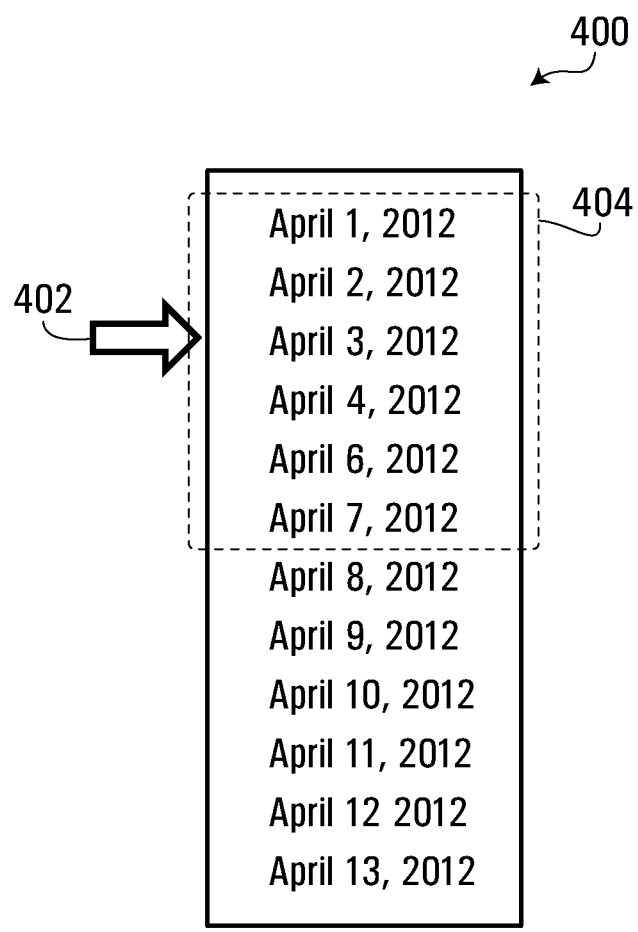
FIG. 4 shows an example list of dates.

FIG. 4 shows an example of a navigable list 400 of dates. The list 400, in this example, includes the dates of the calendar event items in the list 300 shown in FIG. 3 as well as additional dates. The list 400 includes has a navigation position 402 that can move throughout the list 400. More particularly, in this example, the current navigation position 402 is indicated by an arrow in FIG. 4, but it is to be understood that the navigation position 402 is a movable reference point in the list 400. Any suitable method of navigating a list may be utilized to navigate the list 400 of dates. A displayed portion 404 of the list 400 of dates is also shown in FIG. 4 (indicated by a stippled line box). The displayed portion 404, in this example, includes the dates for a week from Sunday Apr. 1, 2012 to Saturday Apr. 7, 2012. However, as will be discussed below, example embodiments are not limited to a particular arrangement of the displayed portion 404 of the list 400 of dates.

The displayed portion of the list of dates may be displayed in an orientation that contrasts with the displayed portion of the list of calendar event items. For example, the displayed portion of the list of dates may be oriented in a horizontal bar fashion (see for example date areas 502 of FIGS. 5A and 5B, 602 of FIGS. 6A and 6B, and 702 of FIG. 7), while the displayed calendar event items may be shown in a vertical list (see for example calendar event item areas 504 of FIGS. 5A and 5B, 604 of FIGS. 6A and 6B, and 704 of FIG. 7), thereby contrasting with the horizontal orientation of the dates. Such contrasting orientations of the displayed portion of the list of dates and calendar event items may have the result that, for a user, the dates are easily visible and distinguishable from the list of calendar event items. The relative position of the list of dates to the list of calendar event items may also help draw the user's attention to the list of dates. For example, placing the dates above the list of calendar event items may make the dates more noticeable than having the dates in line or below the list of calendar event items. If the days are presented in a horizontal bar, as described above, the days may be positioned with the first day of the week to the far left, and the last day of the week to the far right. This arrangement may reinforce, to the user, the relative time of week of the data being viewed. However, example embodiments are not limited to this arrangement of the days in a horizontal bar.

Turning again to FIG. 2, at block 2-3, the navigation position of the list of calendar event items and the navigation position of the list of dates are coordinated. (Examples of a list of calendar event items are shown at calendar event item areas 504 of FIGS. 5A and 5B, 604 of FIGS. 6A and 6B and 704 of FIG. 7. An examples of a navigation position of a list of calendar event items is shown at navigation position 550 of FIGS. 5A and 5B. Examples of a list of dates are shown at date areas 502 of FIGS. 5A and 5B, 602 of FIGS. 6A and 6B, and 702 of FIG. 7. Examples of a navigation position of a list of dates are shown at date markers 518 of FIGS. 5A and 5B and 618 of FIGS. 6A and 6B.) In some example embodiments, coordinating the navigation position of the list of calendar event items and the navigation position of the list of dates is accomplished by adjusting the navigation position of the list of calendar event items responsive to navigating the list of dates. In some example embodiments, the coordination is accomplished by adjusting the navigation position of the list of dates responsive to navigating the list of calendar event items. In the present example embodiment, the navigation position of the list of calendar event items and the navigation position of the list of dates are coordinated by: adjusting the navigation position of the list of calendar event items responsive to navigating the list of dates; and adjusting the navigation position of the list of dates responsive to navigating the list of calendar event items. The display of the list of calendar event items and the list of dates may thereby be synchronized.

If user input is received for navigating the list of calendar event items, the list of calendar event items is navigated in response (i.e. the navigation position of the list changes accordingly). According to some example methods, the list of dates is coordinated with this navigating of the list of calendar event items. In particular, the navigation position of the list of dates may be adjusted responsive to navigating the list of calendar event items. As a more specific example, if the navigated list of calendar event items displays items having a different date than the previous displayed items, then the navigation position of the list of dates may be adjusted so that the date marker changes to reflect the new date. Conversely, if user input is received that changes the navigation position of the list of dates (e.g. by selecting a new date or by navigating the list of dates), thereby also moving the date marker, the navigation position of the list of calendar event items may be adjusted accordingly so that the displayed portion of the list of calendar event items includes items having the date designated by the date marker.

The method described above may allow a user of a device to navigate through a list of calendar event items by either one of 1) navigating the list of calendar event items; and 2) navigating the corresponding list of dates. In addition, because the list of dates (including the date marker) is automatically updated responsive to navigating the list of calendar event items, a user may be able to easily identify the date of at least one of the displayed calendar event items by referring to the date marker on the displayed portion of the list of dates.

In some example embodiments, dates in which no calendar events are scheduled (i.e. free days) may optionally be automatically skipped when the navigation position of the list of dates is updated. The free dates may also be omitted from the list of dates, and may not be displayed. For example, if a user only has events on Monday and on the following Friday, then the displayed portion of the list of dates may not include Tuesday, Wednesday and Thursday. The displayed portion of the list of dates may go directly from Monday to Friday.

FIGS. 5A to 7 show some examples of how the list of calendar event items and the list of dates may be displayed. Example embodiments are not limited to the display formats described above, or to those shown in the figures. Other display formats are possible.

Figure 5A:
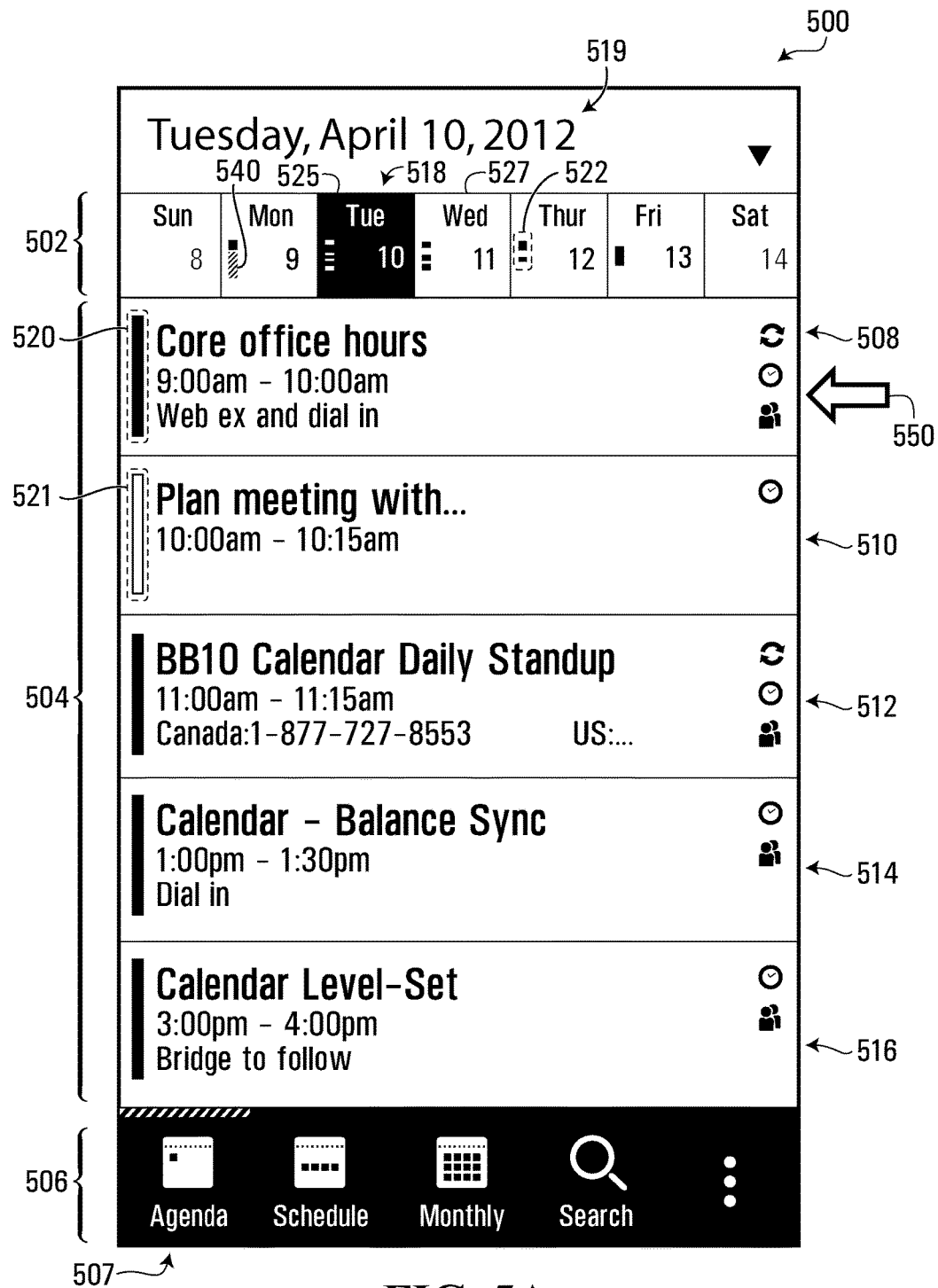
FIGS. 5A and 5B show one example of a calendar user interface according to some example embodiments.
Figure 5B:
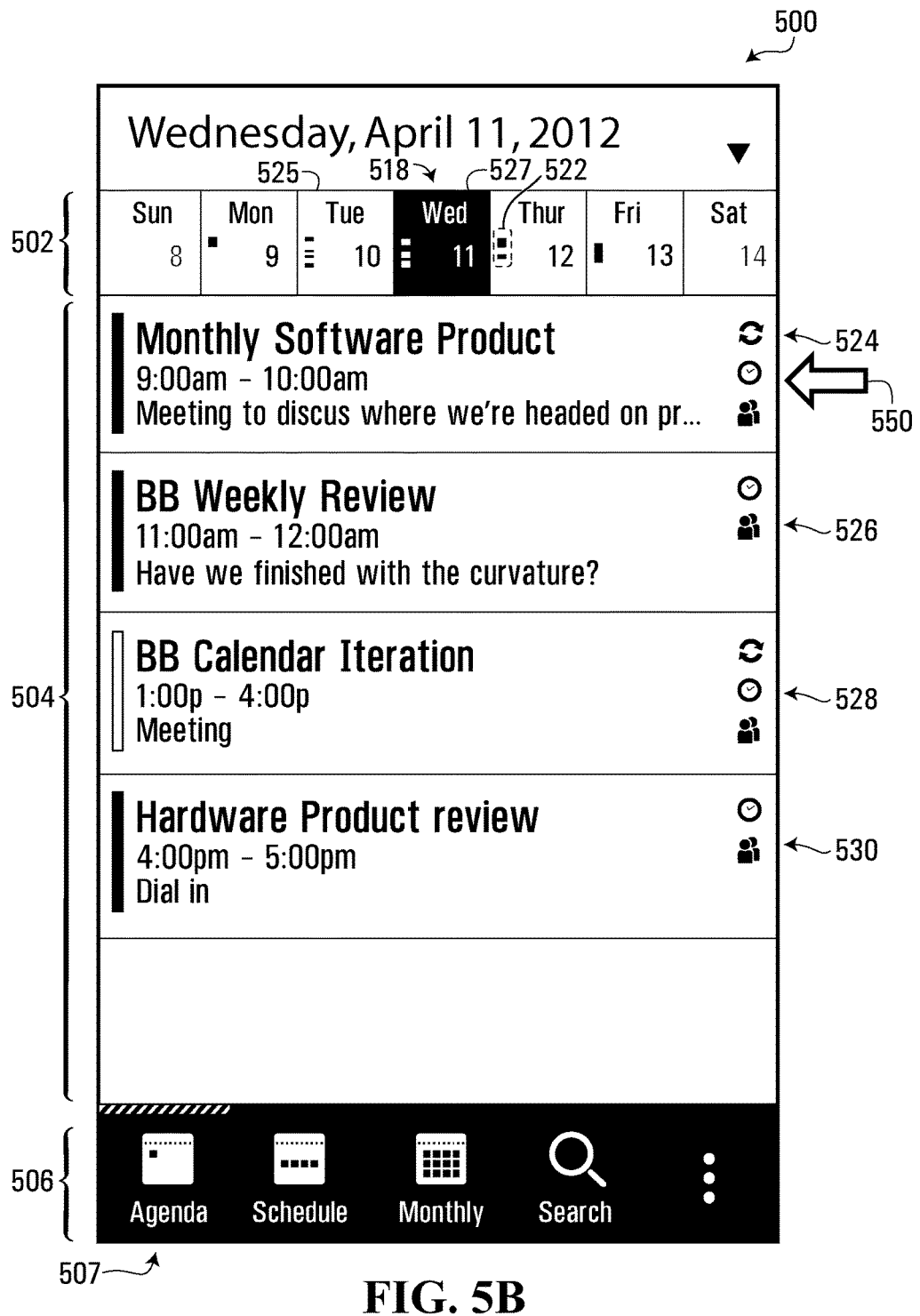

FIGS. 5A and 5B show one example of a calendar user interface 500 for displaying calendar event items and dates according to some example embodiments. It should be understood that the example is not intended to be specific to the actual data displayed. The interface 500 may be presented on a touch screen of a mobile device, although example embodiments are not limited to touch screens or to any particular type of device. The interface 500 includes a date area 502 for displaying at least a portion of a list of dates, a calendar event item area 504 for displaying at least a portion of a list of calendar event items and a view select area 506. The view select area 506 includes selectable options to select view types (such as "Agenda" view, a one week calendar view, a one month calendar view, and a search view), and the "Agenda" selection area 507 has been selected.

In FIG. 5A, the displayed portion of the list of calendar event items (in area 504) includes calendar event items 508, 510, 512, 514, and 516. The list of calendar event items in this example includes additional event items not displayed in FIG. 5A. In FIG. 5A, a navigation position 550 (as indicated by an arrow) of the list of calendar event items is shown at calendar event item 508 (i.e. the top of the displayed list). It is to be understood, however, that the arrow used to show the navigation position 550 is not actually displayed in the interface 500, but is shown simply for illustrative purposes. However, the navigation position may be indicated visually in the interface in some example embodiments. For example, the navigation position may be shown by highlighting or otherwise distinguishing the calendar event item at the current the navigation position.

The date area 502 includes dates between Sunday Apr. 8, 2012 to Saturday Apr. 14, 2012. Each numerical day is displayed in a box that also contains the abbreviation for the respective day of the week. In this example, the navigation position of the list of dates is set to match the date of the displayed portion of the calendar event items, namely Tuesday, Apr. 10, 2012. A date marker 518 is displayed and is set to indicate the navigation position of the list of dates. Therefore, the date marker 518 indicates the date for the first displayed calendar event item. In this example, the date marker 518 is shown by filling in/coloring a box 525 (which contains "Tue 10" in this example) thereby drawing attention to that date, whereas boxes for other dates are not filled in. The interface 500 further includes a date indicator box 519 that includes the full date that is marked by the date marker. This date indicator box is optional, however. An indication of the currently displayed date range may be provided in place of, or in addition to the date indicator box 519. Such additional indications of date(s) and/or the date range may be omitted. The interface 500 further includes a status indicator bar (such as bars 520 and 521) for each of calendar event items 508, 510, 512, 514, and 516. These status bars are used in this example of how the status of the calendar event items may be shown in some example embodiments. Different colors or patterns for the bars may be used to designate different statuses such as "busy", "free", "tentative" etc. Status indicators for the calendar event items are not required, but are provided herein as an example.

In this example, the list of dates (in date area 502) is displayed in a horizontal grid across the top of the list of calendar event items, and the list of calendar event items (in calendar event item area 504) is shown in a vertical list. The list of dates in this example may be navigated by touching a date that is displayed or by swiping the displayed portion of the list of dates horizontally (i.e. a user may swipe their finger horizontally across the date area 502). The list of calendar event items may be navigated by for example horizontally swiping or by vertical scrolling the displayed portion of the list of calendar event items in the area 504. The list of dates and the list of calendar event items are synchronized as described above with reference to FIGS. 1 and 2.

FIG. 5B is an example of what may be displayed if a user (using the interface 500 shown in FIG. 5A) either: 1) navigates the list of calendar event items (in calendar event item area 504) to a group of items having the date of Apr. 11, 2012; or 2) navigates the list of dates (in date area 502) to Apr. 11, 2012. If the list of calendar event items is navigated, the displayed portion of the list of dates will be updated in response. If the list of dates is navigated, the displayed portion of the list of calendar event items will be updated in response. In particular, as shown in FIG. 5B, the navigation position 550 of the list of calendar event items has been moved to the first item having the date Apr. 11, 2012, and the calendar event item area 504 now includes all calendar event items (524, 526, 528 and 530) that have the date Apr. 11, 2012. In some example embodiments, this transition of the displayed portion of the list of calendar event items from a first state to a second, updated state (e.g. scrolling or swiping from the calendar event items for Apr. 10, 2012 to the items for Apr. 11, 2012) may include an animation. However, an animation is not required. For example, the animation may include the old calendar event items being animated to exit to the left and the new calendar event items entering from the right (or vice versa). The animation may match the direction of the movement of the user's finger in a scrolling or swiping motion when providing user input. Other animations are possible.

As also shown in FIG. 5B, the navigation position of the list of dates in date area 502 (as indicated by the date marker 518 in this example) is coordinated with the navigation position 550 of the list of calendar event items in calendar event item area 504. In particular, the navigation position of the list of dates has been moved to Apr. 11, 2012, and the date marker 518 has also moved to Apr. 11, 2012 (by filling in/coloring box 527). The user may easily see that the date of the displayed calendar event items has changed.

As shown in FIG. 5B, the displayed portion of the list of calendar dates (in date area 502) has not shifted or been updated other than moving the date marker. In this example, the displayed portion of the list of calendar dates shows one week (from Sunday to Saturday), and the numerical days in the displayed portion are updated if the navigation position (which matches date marker 518 in this example) moves outside of the currently displayed week. For example, if the navigation position of the list of dates moves from a Saturday to the next day Sunday, the displayed portion of the list of dates will adjust so that the next week of numerical days is displayed. Similarly, if the navigation position of the list of dates moves from a Sunday to the previous day Saturday, the displayed portion of the list of dates will adjust so that the previous week of numerical days is displayed. In some example embodiments, a user may select particular days by touching the numerical date. Furthermore, a user can shift the navigation position of the list of dates by one week at a time by horizontally swiping. However, other schemes may be employed for displaying and coordinating a portion of the list of dates in other embodiments. For example, the displayed portion of the list of dates may be adjusted so that the date marker does not move relative to the touch screen, while the displayed numerical days shift left or right accordingly.

Although not shown in FIGS. 5A and 5B, adjusting the displayed list of calendar event items (in calendar event item area 504) may include displaying an animation. More particularly, adjusting the navigation position (indicated by the date marker 518 in this example) of the list of dates responsive to navigating the list of calendar event items may include displaying an animation of a transition of the displayed at least a portion of the list of dates from a pre-adjusted state to a post-adjusted state. An animation may draw a user's attention to the fact that the displayed calendar event items have a date that is different than the previously displayed calendar event items. Any suitable animation may be utilized.

As an example, consider the example of FIG. 5A where the displayed portion of the list of dates in area 502 of FIG. 5A is adjusted so that the date marker 518 moves from Apr. 10, 2012, to Apr. 11, 2012 (shown in FIG. 5B). In this example, the date marker drawing attention to Apr. 10, 2012 in FIG. 5A is the pre-adjusted state, and the date marker drawing attention to Apr. 11, 2012 in FIG. 5B is the post-adjusted state. Box 525 shown in FIGS. 5A and 5B includes the date for Apr. 10, 2012 and the box 527 includes the date for Apr. 11, 2012. The box 525, the date shown as "Tue 10", or the number "10", may temporarily enlarge. When the box 525 has been enlarged, the box 527 (and the date shown as "Wed 11" itself) may also enlarge at which point the date marker 518 moves to the box 527. At this point the boxes 525 and 527 and dates may return to their normal sizes. This animated transition is only described as one example. Any suitable animation for indicating or demonstrating an update to the displayed portion of the list of dates and/or the displayed portion of the list of calendar event items may be used. Again, animations are not required and are not used in some example embodiments.

Figure 6A:
FIGS. 6A and 6B show another example of a calendar user interface according to some example embodiments.
Figure 6B:
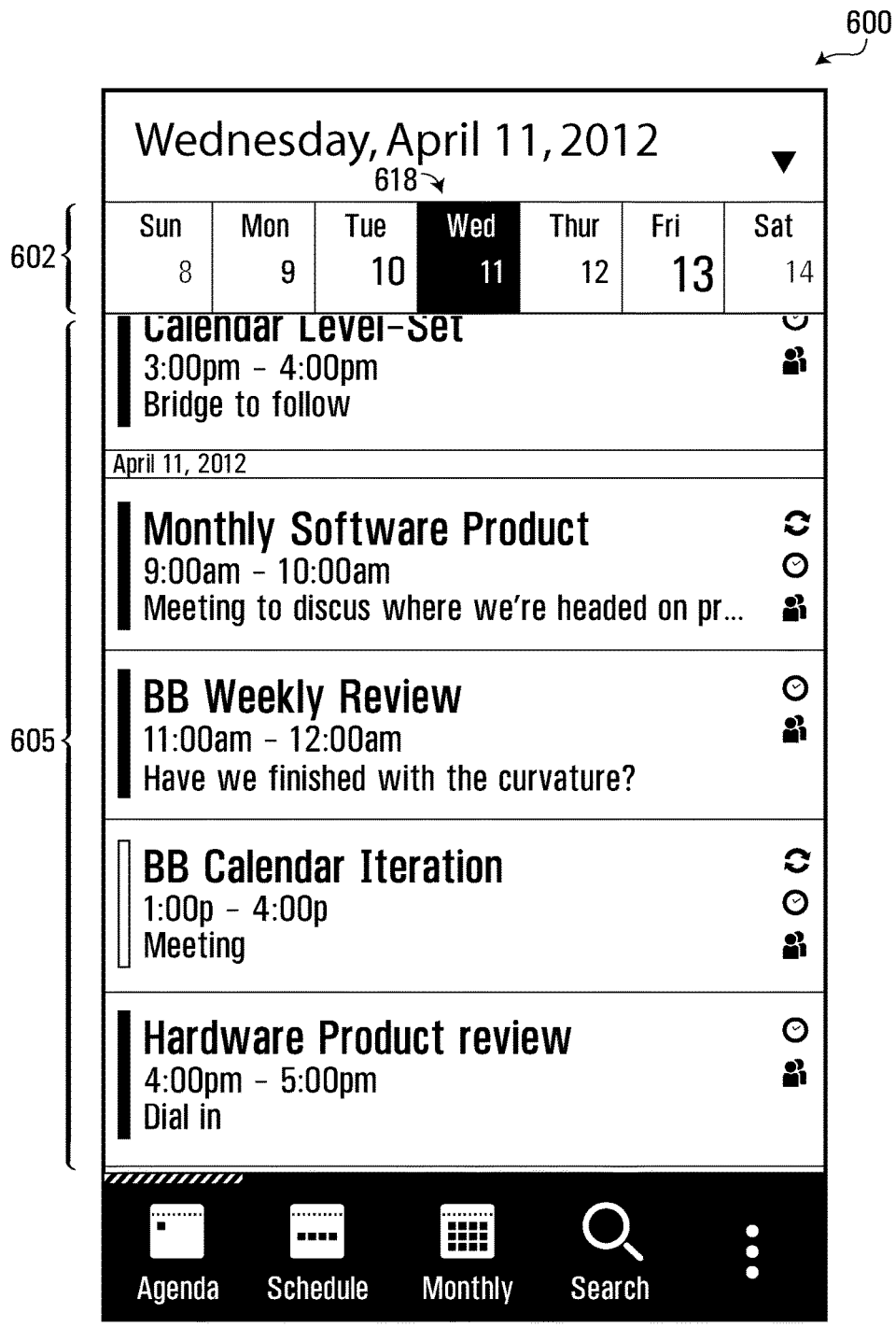

FIGS. 6A and 6B show another example interface 600. This interface is similar to the interface 500 shown in FIGS. 5A and 5B. Interface 600 includes a date area 602, a calendar event item area 604 and a view selection area 606. However, the displayed portion of the list of calendar event items in the area 604 includes items having multiple dates. In other words, the displayed portion of the list of calendar dates is not limited to items having a particular date. The list is organized chronologically according to the dates and start times of the calendar event items. The list of calendar event items may be scrolled vertically by the user in this example. The navigation position of the list of dates and the navigation position of the list of calendar event items are coordinated such that that date marker 618 corresponds to the earliest date for a displayed calendar event item that is completely displayed.

Figure 7:
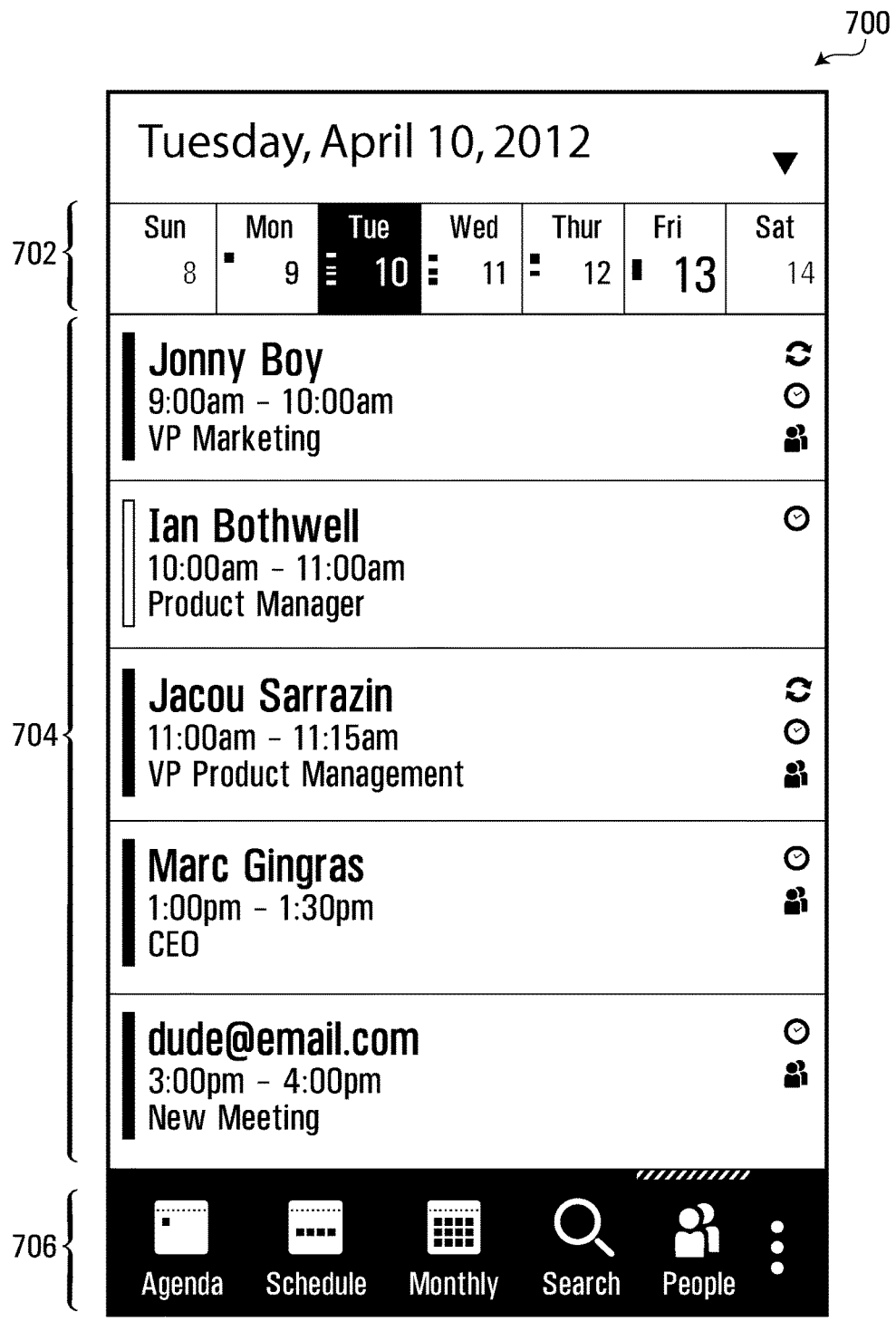
FIG. 7 shows another example of a calendar user interface according to some example embodiments.

FIG. 7 shows yet another example interface 700 in accordance with some example embodiments. The interface 700 is similar to the interface 600 shown in FIGS. 6A and 6B. However, as will be discussed below, calendar event items in this example include participant data. Interface 700 includes a date area 702 for displaying a portion of a list of dates, a calendar event item area 704 for displaying a portion of a list of calendar event items, and a view selection area 706. The view selection area 706 includes a "people" view selection, which is selected in this example. When the "people" view selector 707 is selected, the calendar event items displayed in the calendar event item area 704 include the identities of one or more participants that are scheduled to attend calendar event items.

Figure 8:
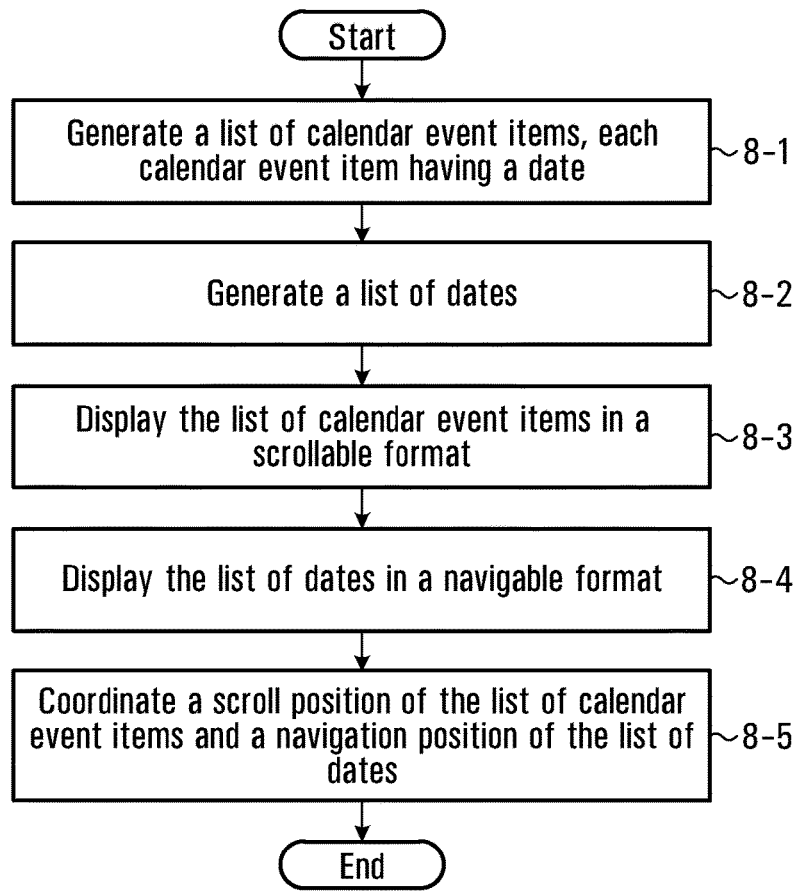
FIG. 8 is a flowchart of another example method for managing and viewing calendar information according to some example embodiments.

According to some example embodiments, the list of calendar event items and/or the list of dates may be generated from calendar data. FIG. 8 is a flowchart of another method for managing and viewing calendar information according to some example embodiments. The method shown in FIG. 8 may be performed by an apparatus and may be implemented with the use of one or more processors. For example, the method shown in FIG. 8 may be performed by a client device.

At block 8-1 a list of calendar event items is generated from calendar data. (Examples of at least part of a list of calendar event items are shown in calendar event item areas 504 of FIGS. 5A and 5B, 604 of FIGS. 6A and 6B, and 704 of FIG. 7.) The calendar data includes, for each of at least one calendar event, at least a respective data item indicating a date for the calendar event. The calendar date may also include additional data items. For example, the calendar data may also include data items indicating an event type, location, participant(s), start and/or end times, etc. In this example, each calendar event item corresponds to a respective one of said at least one calendar event. Each calendar event item has a respective date, and the date for each calendar event item is the date for the respective calendar event. Generating the list of calendar event items may include retrieving one or more data items for at least one calendar event from the calendar data. For example, the list of calendar event items may include data for a plurality of calendar event items including the date, start time and/or location of the event. In some example embodiments, the list of calendar event items includes, for each calendar event, an indication of at least one participant. Example embodiments are not limited to any particular type of information contained in the list of calendar event items.

At block 8-2, a list of dates is generated, where the list of dates includes at least dates in a date range defined by the dates of the calendar event items. (Examples of at least part of a list of dates are shown in date areas 502 of FIGS. 5A and 5B, 602 of FIGS. 6A and 6B, and 702 of FIG. 7.) For example, the list of dates may include every day between an earliest date of any calendar event item in the list of calendar event items and a latest date of any calendar event item in the list of calendar event items. Additional dates may also be included in the list of dates. The list of dates may be generated directly from the calendar data or from the list of calendar event items.

In some example embodiments, the list of calendar event items and the list of dates are generated concurrently, although the two lists may, instead, be generated separately and at different times.

At block 8-3, the list of calendar event items is displayed in a navigable format such that, at least a portion of the list of calendar event items is displayed as a function of a navigation position of the list of calendar event items. At block 8-4, the list of dates is displayed in a navigable format such that at least a portion of the list of dates and a date marker (see for example date markers 518 of FIGS. 5A and 5B and 618 of FIGS. 6A and 6B) drawing attention to one of the dates in the at least a portion of the list of dates are displayed as a function of a navigation position of the list of dates. At block 8-5, the navigation position (see for example navigation position 550 of FIGS. 5A and 5B) of the list of calendar event items and the navigation position of the list of dates are coordinated such that the date designated by the date marker is an earliest one of the dates of calendar event items in the displayed at least a portion of the list of calendar event items.

In some example embodiments, rather than generating both the list of calendar items and the list of dates, one or both of those lists may be received. For example, the list of calendar items and/or the list of dates may be received from a network component, such as a server. In some example embodiments, the client device requests the lists of dates and/or the list of calendar event items from the network component (rather than generating one or both of the lists).

Figure 9:
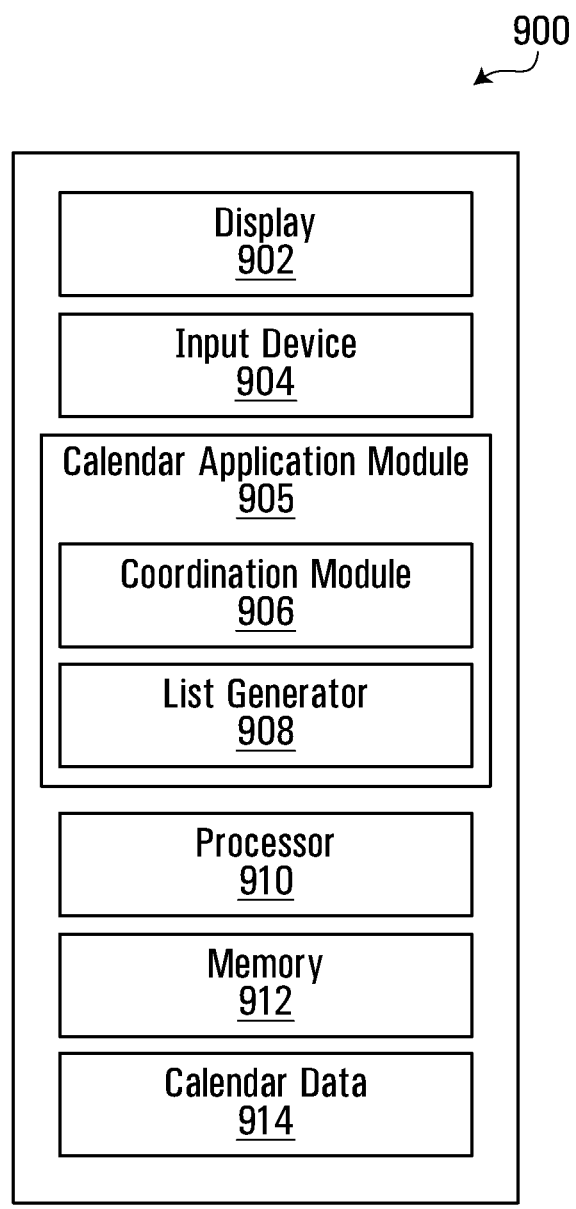
FIG. 9 is a block diagram of an example apparatus which may implement the method of FIG. 8.

FIG. 9 is a block diagram of an example apparatus 900 which may implement the method of FIG. 8. The apparatus 900 may be a client device. The device 900 includes a display 902, an input device 904, a calendar application module 905, a coordination module 906, a list generator 908, a processor 910, and a memory 912. The apparatus 900 is also shown in this example as having access to calendar data 914 that is stored at the apparatus 900. The calendar data may be similar to calendar data 112 shown in FIG. 1. In this example, the coordination module 906 and the list generator 908 are shown as part of the calendar application module 905. However, it is to be understood that the coordination module 906 and the list generator 908 may be separate modules. The display 902, the input device 904, and the coordination module 906 are similar to the display 102, the input device 104, and the coordination module 107 shown in FIG. 1.

The list generator 908 generates a list of calendar event items and a list of dates as described above. In some example embodiments, the list of calendar event items and the list of dates are generated by separate modules rather than by a singe list generator 908. The calendar application module 905 controls the display 902 to display the list of calendar event items in a navigable format and the list of dates in a navigable format.

The calendar application module 905, the coordination module 906 and the list generator 908 may be implemented as a processor (such as the processor 910). The calendar application module 905, the coordination module 906 and the list generator 908 may be implemented as a memory (such as the memory 912) containing instructions for execution by a processor (such as the processor 910), by hardware, or by a combination of instructions stored in a memory and additional hardware, to name a few examples.

The apparatus 900 may also include additional components not shown such as a receiver and a transmitter.

In some example embodiments, an apparatus (such as the apparatus 900) may include a receiver for receiving the list of calendar event items and/or the list of dates (e.g. from a network component). The apparatus may also include a transmitter for transmitting a request for the list of calendar event items and/or the list of dates. The request may be transmitted, for example, for receipt by a network component. The receiver and/or the transmitter may be in place of or in addition to a list generator 908 of the apparatus 900 described above.

The list of calendar event items, and the list of dates generated according to some example embodiments may be dynamically generated or modified as the lists are navigated. By dynamically generating or modifying the lists, a user may be given the ability to navigate through a large number of items covering a large range of dates without requiring that the entire list of calendar event items or list of dates be generated before hand. Computational power and memory use may thereby be reduced and/or distributed over the time that a user is navigating through the lists. Furthermore, the user may be provided with the appearance of an "infinite" list of calendar event items that is not limited to a particular number of event items or a particular date range.

Figure 10:
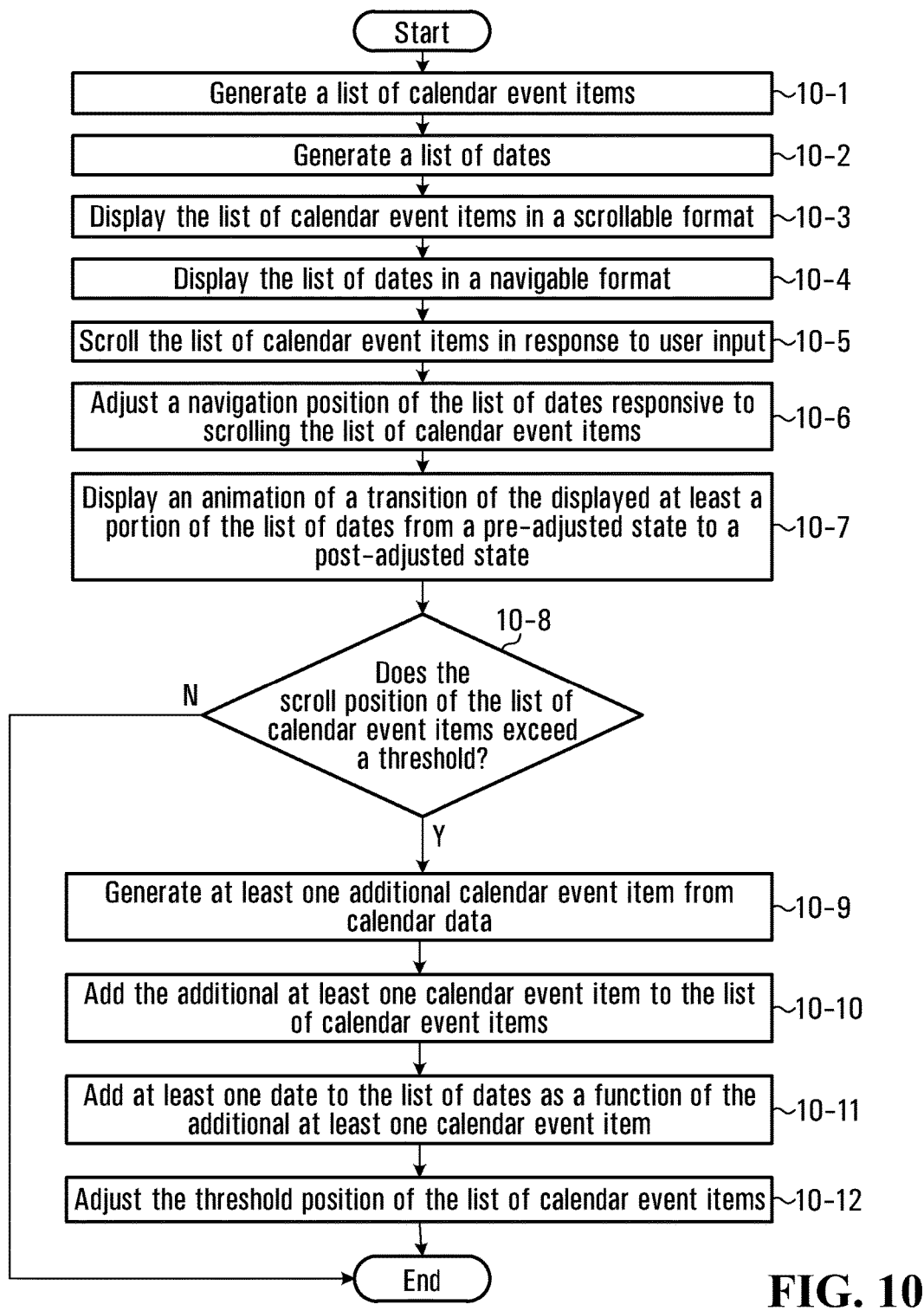
FIG. 10 is a flowchart of another example method for managing and viewing calendar information according to some example embodiments.

FIG. 10 is a flowchart of another method for managing and viewing calendar information according to some example embodiments. The method shown in FIG. 10 may be performed by an apparatus and may be implemented with the use of one or more processors. For example, the method shown in FIG. 10 may be performed by a client device.

At block 10-1, a list of calendar event items is generated from calendar data. (Examples of at least part of a list of calendar event items are shown in calendar event item areas 504 of FIGS. 5A and 5B, 604 of FIGS. 6A and 6B, and 704 of FIG. 7.) At block 10-2, a list of dates is generated, where the list of dates includes at least dates in a date range defined by the dates of the calendar event items. (Examples of at least part of a list of dates are shown in date areas 502 of FIGS. 5A and 5B, 602 of FIGS. 6A and 6B, and 702 of FIG. 7.) The list of calendar event items may be limited by a maximum number of calendar event items, or may be limited by a maximum date range of calendar event items. For example, the list of calendar event items may initially be generated such that it includes calendar event items for calendar event items that have a date at or after a starting date (e.g. the current date) and possibly at or before an end date. The list of calendar event items may also be limited to a predetermined number (for example, 15, 50, or 100 calendar event items). Example embodiments are not limited to any particular limit on the list of calendar event items and/or the list of dates. Furthermore, in some example embodiments, the list of calendar event items and/or the list of dates may not be limited as described above.

At block 10-3, the list of calendar event items is displayed in a scrollable format such that, at least a portion of the list of calendar event items is displayed as a function of a navigation position (see for example navigation position 550 of FIGS. 5A and 5B) of the list of calendar event items. At block 10-4, the list of dates is displayed in a navigable format such that at least a portion of the list of dates and a date marker (see for example date markers 518 of FIGS. 5A and 5B and 618 of FIGS. 6A and 6B) drawing attention to one of the dates in the at least a portion of the list of dates are displayed as a function of a navigation position of the list of dates.

At block 10-5, the list of calendar event items is scrolled in response to user input. In some example embodiments, the method further comprises receiving the user input for scrolling the list of calendar event items. At block 10-6, the navigation position of the list of calendar event items and the navigation position of the list of dates are coordinated such that the date designated by the date marker is an earliest one of the dates of calendar event items in the displayed at least a portion of the list of calendar event items. In this particular example, the coordination is accomplished by adjusting the navigation position of the list of dates responsive to the scrolling of the list of calendar event items.

When the navigation position of the list of dates is adjusted, the displayed portion of the list of dates is updated accordingly. In this example, updating the list of dates comprises moving the date marker as a function of the new navigation position of the list of dates. This display transition may be animated as described earlier. In particular, at block 10-7, an animation of a transition of the displayed at least a portion of the list of dates from a pre-adjusted state to a post-adjusted state is displayed.

At block 10-8, if the navigation position of the list of calendar event items exceeds a threshold position for the list of calendar event items (yes path, block 10-8), then at block 10-9, at least one additional calendar event item is generated from the calendar data. The threshold position may be an upper or lower threshold position in the list. If the navigation position of the list of calendar event items does not exceed the threshold position for the list of calendar event items (no path, block 10-8), then the method ends. In some example embodiments, the threshold position is a predetermined number (e.g. 5 or 10) of calendar event items away from a bottom of the list. For example, if the list of calendar event items includes 50 calendar event items, the threshold position for the list of calendar items may be the 45th calendar event item in the list. If the navigation position reaches and/or passes this item, the at least one additional calendar event item is generated. For example, if the navigation position moves upward in the list past an upper threshold position, the upper threshold position is considered to be exceeded. If the navigation position moves downward in the list past a lower threshold position, the lower threshold position is considered to be exceeded. Example embodiments are not limited to any particular method of setting a navigation position threshold or of obtaining the at least one additional calendar event item when the threshold is exceeded.

In other example embodiments, the at least one additional calendar event item is received rather than generated. The at least one additional calendar event item may also be requested (for example from a network component).

In some example embodiments, a threshold position may be set with respect to the top of the list, such that if the navigation position moves upward in the list and reaches and/or passes the threshold, at least one additional calendar event item is generated and/or received. In some example embodiments, more than one threshold may be used (e.g. one lower list threshold and one upper list threshold).

At block 10-10, the at least one additional calendar event item is added to the list of calendar event items. In some example embodiments, the at least one additional calendar event item is appended to the bottom of the list. In other example embodiments, the at least one additional calendar event item is added to the top of the list. At least one of the calendar event items that were in the list before the at least one additional calendar event item was added may be removed from the list. For example, the total size of the list of calendar event items may be kept below a maximum size in order to conserve the amount of memory required to store the list of calendar event items.

At block 10-11, at least one date is added to the list of dates as a function of the additional at least one calendar event item. In particular, if any date(s) for the at least one additional calendar event item are new, meaning they are not already included in the list of dates, then the list of dates may be updated by adding the new dates for the at least one additional calendar event item.

In this example embodiment, at block 10-12, the threshold position for the list of calendar event items is adjusted. The threshold position may be adjusted to take into account the updated list of calendar event items. For example, if a number of new items were added to the list, the threshold position may be moved by an equal number of items in the list. More specifically, as an example, if 10 new calendar event items were appended to the end of the list of calendar event items, then a lower threshold position may be moved down the list by 10 items (i.e. the threshold position will be 10 calendar event items lower in the list than it was previously). If the new adjusted threshold is subsequently exceeded, the functions described with respect to block 10-9 to 10-11 may be repeated.

Figure 11:
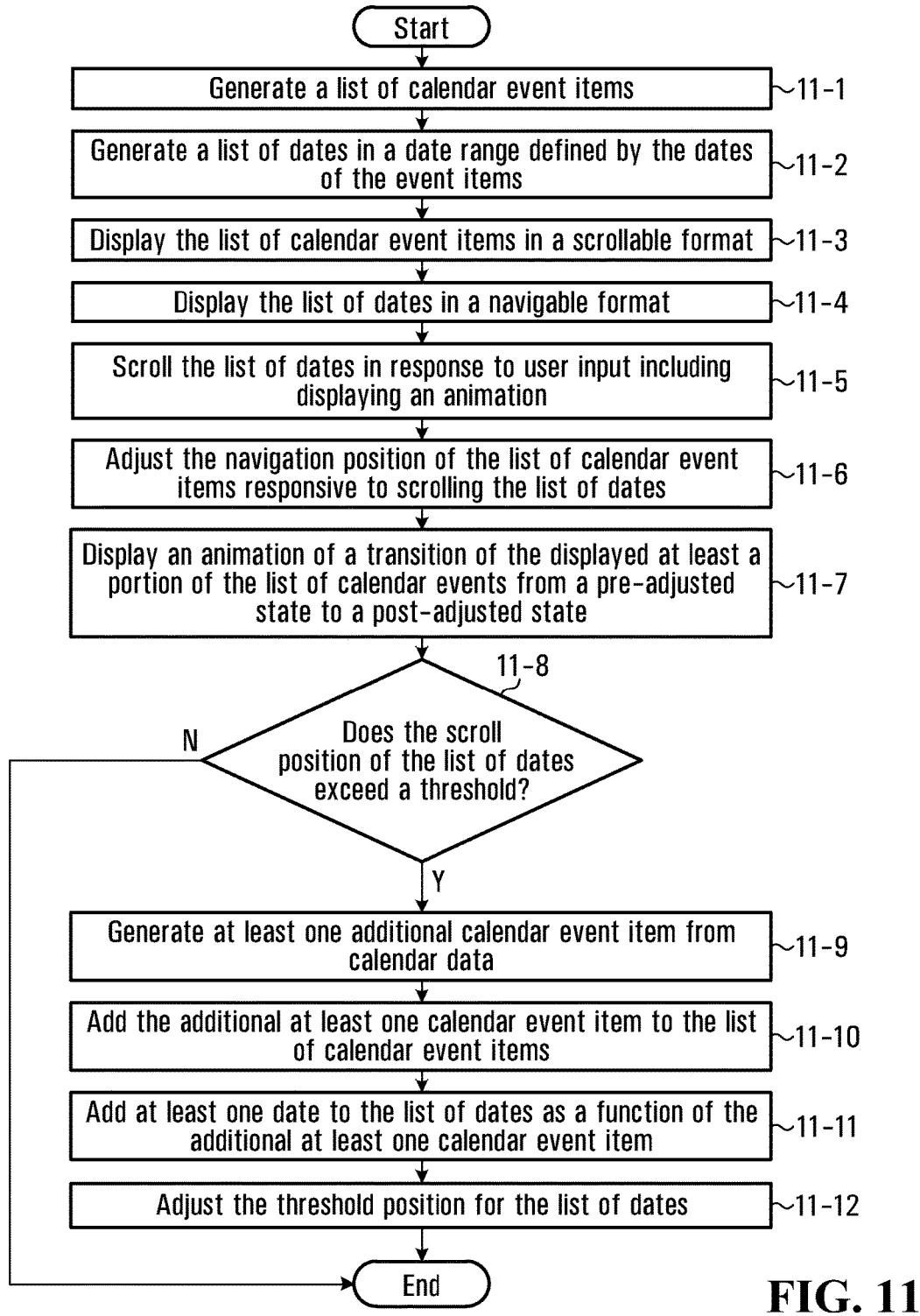
FIG. 11 is a flowchart of another example method for managing and viewing calendar information according to some example embodiments.

FIG. 11 is a flowchart of another method for managing and viewing calendar information according to some example embodiments. The method shown in FIG. 11 may be performed by an apparatus and may be implemented with the use of one or more processors. For example, the method shown in FIG. 11 may be performed by a client device.

At block 11-1 a list of calendar event items is generated from calendar data. (Examples of at least part of a list of calendar event items are shown in calendar event item areas 504 of FIGS. 5A and 5B, 604 of FIGS. 6A and 6B, and 704 of FIG. 7.) At block 11-2, a list of dates is generated, where the list of dates includes dates in a date range defined by the dates of the calendar event items. (Examples of at least part of a list of dates are shown in date areas 502 of FIGS. 5A and 5B, 602 of FIGS. 6A and 6B, and 702 of FIG. 7.) At block 11-3, the list of calendar event items is displayed in a scrollable format such that, at least a portion of the list of calendar event items is displayed as a function of a navigation position (see for example navigation position 550 of FIGS. 5A and 5B) of the list of calendar event items. At block 11-4, the list of dates is displayed in a navigable format such that at least a portion of the list of dates and a date marker (see for example date markers 518 of FIGS. 5A and 5B and 618 of FIGS. 6A and 6B) drawing attention to one of the dates in the at least a portion of the list of dates are displayed as a function of a navigation position of the list of dates.

At block 11-5, the list of dates is navigated in response to user input. In some example embodiments, the method further comprises receiving the user input for navigating the list of dates. In this example, navigating the dates comprises displaying an animation of the transition from a pre-adjusted or pre-navigated state of the list of dates to a post-adjusted or post-navigated state of the list of dates. At block 11-6, the navigation position of the list of calendar event items and the navigation position of the list of dates are coordinated such that the date designated by the date marker is an earliest one of the dates of calendar event items in the displayed at least a portion of the list of calendar event items. In this particular example, the coordination includes adjusting the navigation position of the list of calendar event items responsive to the navigating of the list of dates.

When the navigation position of the list of calendar event items is adjusted, the displayed portion of the list of calendar event items is updated accordingly. In particular, at block 11-7, an animation of a transition of the displayed at least a portion of the list of calendar event items from a pre-adjusted state to a post-adjusted state is displayed.

At block 11-8, if the navigation position of the list of dates exceeds a threshold position for the list of dates, (yes path, block 11-8) then at block 11-9, at least one additional calendar event item is generated from the calendar data similar to block 10-9 of FIG. 10. If the navigation position of the list of dates does not exceed the threshold position for the list of dates (no path, block 11-8), the method ends.

The location of the threshold navigation position of the list of dates in various example embodiments may vary similar to the threshold position of the list of calendar event items as described above with respect to FIG. 10.

At block 11-10, the at least one additional calendar event item is added to the list of calendar event items, similar to Block 10-10 of FIG. 10. At block 11-11, at least one date is added to the list of dates as a function of the additional at least one calendar event item similar to block 10-11 of FIG. 10.

In this example embodiment, at block 11-12, the threshold position for the list of dates is adjusted. The threshold position may be adjusted to take into account the updated list of dates. For example, if a number of new dates were added to the list, the threshold position may be moved by an equal number of dates in the list.

In some example embodiments, there are no threshold positions in either the list of calendar event items or the list of dates. For example, the lists may have absolute limits and no additional calendar event items may be generated and/or no new dates added to the list of dates.

Figure 12:
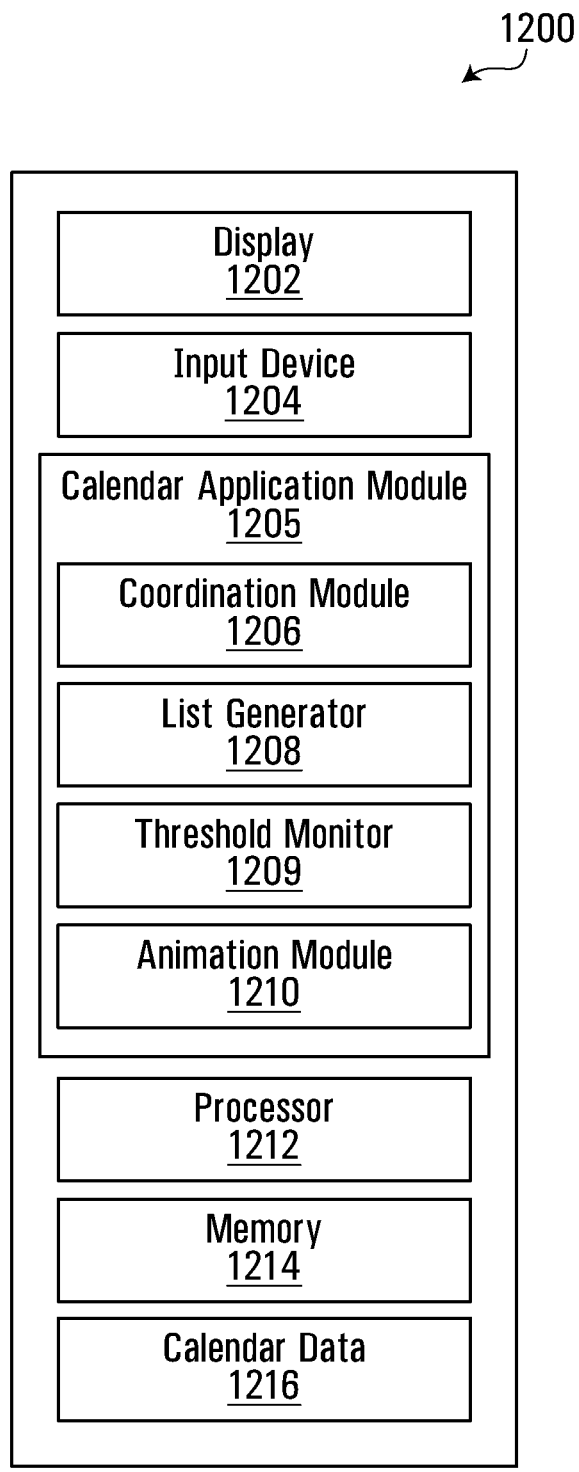
FIG. 12 is a block diagram of an example apparatus which may implement the method of FIG. 10 or 11.

FIG. 12 is a block diagram of an example apparatus 1200 that may implement the method of both FIGS. 7 and 8. The apparatus 1200 comprises a display 1202, an input device 1204, a calendar application module 1205, a coordination module 1206, a list generator 1208, a threshold monitor 1209, an animation module 1210, a processor 1212, and a memory 1214. The apparatus 1200 in this example also has access to calendar data 1216 that is stored at the apparatus. However, the calendar data 1216 may also be stored elsewhere, such as in a network component. In this example, the coordination module 1206, the list generator 1208, the threshold monitor 1209 and the animation module 1210 are shown as part of the calendar application module 1205. However, it is to be understood that the coordination module 1206, the list generator 1208, the threshold monitor 1209 and/or the animation module 1210 may each be separate from the calendar application module 1205. The display 1202, the input device 1204, the coordination module 1206 may be similar to the display 102, input device 104 and coordination module 107 described above with respect to FIG. 1. The list generator 1208 generates the list of calendar event items and the list of dates, similar to the list generator 908 shown in FIG. 9. The calendar application module 1205 controls the display 1202 to display the list of calendar event items in a navigable format and to display the list of dates in a navigable format.

The threshold monitor 1209 monitors a threshold position for the list of calendar event items. The threshold monitor 1209, in this example, also monitors a threshold position for the list of dates, although a threshold monitor may only monitor one of the lists, or may be omitted. The animation module 1210 is configured to generate animations for display when the list of dates is adjusted and/or when the list of calendar event items is adjusted. As described above, animations are not required to be displayed for all embodiments. The list generator 1208 in this example generates at least one additional calendar event item if the threshold monitor 1209 determines that a threshold position has been exceeded, in accordance with the methods described above. The list generator also adds the at least one additional calendar event item to the list of calendar event items and also updates the list of dates accordingly as described above. In other embodiments, a component other than the list generator 1208 may generate and/or add the additional at least one calendar.

The calendar application module 1205, the coordination module 1206, the list generator 1208, the threshold monitor 1209, and the animation module 1210 may be each implemented as a processor (such as the processor 1212). The calendar application module 1205, the coordination module 1206, the list generator 1208, the threshold monitor 1209, and the animation module 1210 may be implemented as a memory (such as the memory 1214) containing instructions for execution by a processor (such as the processor 1212), by hardware, or by a combination of instructions stored in a memory and additional hardware, to name a few examples.

The apparatus 1200 may also include additional components not shown such as a receiver and a transmitter.

According to some aspects, a user interface may display an indicator, for each day of a date range, of a user's activity level according to the events scheduled for that day. The term "activity level" used herein generally refers to how busy or occupied a user's day is. For example, a user's activity level may refer to either the number of events for a day or to a total amount of time occupied by events. A user may then assess their expected activity level or availability for a given date, or over some or all of the date range, by simply viewing the respective visual indicators rather than by looking through a list of the events for each day. A visual indicator may be any visible identifying feature shown on a display. Some examples of possible visual indicators are shown in FIGS. 5A to 7, which are further described below.

Figure 13:
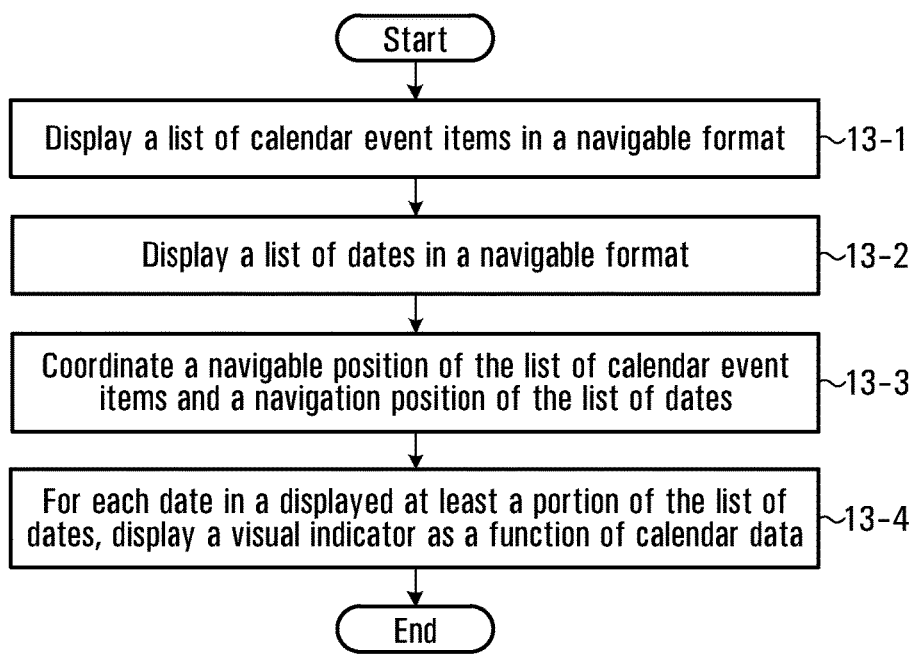
FIG. 13 is a flowchart of another example method for managing and viewing calendar information according to some example embodiments.

FIG. 13 is a flowchart of an example method for managing and viewing calendar information according to some example embodiments. The method shown in FIG. 13 may be performed by an apparatus and may be implemented with the use of one or more processors. For example, the method shown in FIG. 13 may be performed by a client device.

At block 13-1, the list of calendar event items is displayed in a scrollable format such that at least a portion of the list of calendar event items is displayed as a function of a navigation position of the list of calendar event items. (Examples of a list of calendar event items are shown in calendar event item areas 504 of FIGS. 5A and 5B, 604 of FIGS. 6A and 6B, and 704 of FIG. 7. An example of a navigation position of the list of calendar event items is shown at 550 of FIGS. 5A and 5B.) At block 13-2, the list of dates is displayed in a navigable format such that at least a portion of the list of dates and a date marker drawing attention to one of the dates in the at least a portion of the list of dates are displayed as a function of a navigation position of the list of dates. (Examples of a list of dates are shown in date areas 502 of FIGS. 5A and 5B, 602 of FIGS. 6A and 6B, and 702 of FIG. 7. Examples of date markers are shown at 518 of FIGS. 5A and 5B and 618 of FIGS. 6A and 6B.) At block 13-3, the navigation position of the list of calendar event items and the navigation position of the list of dates are coordinated. At block 13-4, for each date displayed in the at least a portion of the list of dates, a visual indicator is displayed as a function of the calendar data. The calendar data in this example includes, for each of the at least one calendar event, at least respective data items indicating the date of the event and a total time occupied by the event.

Figure 14:
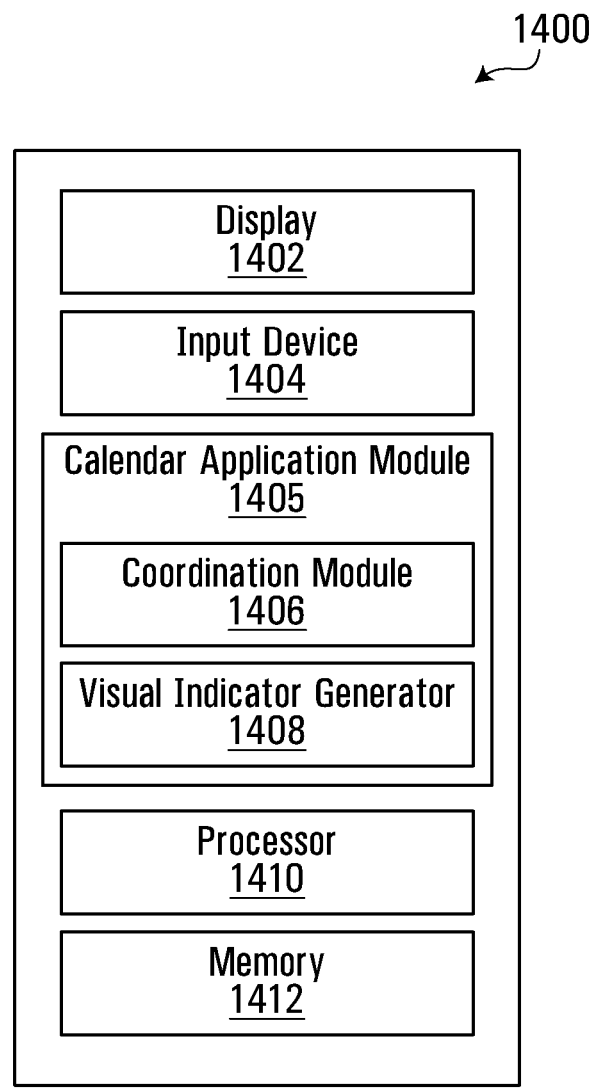
FIG. 14 is a block diagram of an example apparatus which may implement the method of FIG. 13.

FIG. 14 is a block diagram of an example apparatus 1400 which may implement the method of FIG. 13. The apparatus 1400 may be a client device. The device 1400 includes a display 1402, an input device 1404, a calendar application module 1405, a coordination module 1406, a visual indicator generator 1408, a processor 1410, and a memory 1412. The apparatus 1400 in this example also has access to calendar data 1414 that is stored at the apparatus 1400. However, the calendar data 1414 may also be stored elsewhere, such as in a network component. In this example, the coordination module 1406 and the visual indicator generator 1408 are shown as part of the calendar application module 1205. However, it is to be understood that the coordination module 1406 and/or the visual indicator generator 1408 may each be separate from the calendar application module 1205. The display 1402, the input device 1404, and the coordination module 1406 are similar to the display 102, the input device are 104, and the coordination module 107 shown in FIG. 1. The calendar application module 1405 controls the display 1402 to display the list of calendar event items in a navigable format and to display the list of dates in a navigable format. The visual indicator generator 1408 generates a visual indicator as a function of calendar data. The apparatus 1400 may also include a list generator (such as the list generator 908 of the apparatus 900 shown in FIG. 9).

The calendar application module 1405, the coordination module 1406 and the visual indicator generator 1408 may be implemented as a processor (such as the processor 1410). The coordination module 1406 and the visual indicator generator 1408 may be implemented as a memory (such as the memory 1412) containing instructions for execution by a processor (such as the processor 1410), by hardware, or by a combination of instructions stored in a memory and additional hardware, to name a few examples.

The apparatus 1400 may also include additional components not shown such as a receiver and a transmitter.

In some example embodiments, the visual indicator is a text or font setting (such as the font size or bold type) of the displayed numerical day. The term "font setting" refers to any characteristic of a font that defines or alters its appearance. As used herein, the "font size" of a numerical day refers to the size of the number (i.e. the numerical day) displayed in a calendar for a given day. Specifically, in some example embodiments, the font size of a displayed numerical day is determined as a function of the calendar data. For example, as will be explained below, the font size of the numerical day may be larger for days where a user is busier than for days where the user is less busy. Thus, a user may look at the displayed portion of the list of dates and quickly assess their relative activity level or availability for different dates. Example embodiments are not limited to the visual indicator being the font size of the numerical day. In other embodiments, other text or font settings (such as color, bold type, italics, etc), may be used as the visual indicator.

In some example embodiments, the visual indicator includes an animation. For example, the visual indicator may be a combination of a font feature (such as font size) and an animation. In such example embodiments, when a date is first displayed, it may be in a default font size and then animate to grow to a different size as a function of calendar data. Other animations (such as pulsing, flashing, or any other animation indicator) may be used in combination with any possible indicator or an animation may be used alone without another visual indicator. Animations may also be omitted, and example embodiments are not limited to any particular visual indicator. Furthermore, visual indicators as described herein (to indicate a user's activity level) are not required.

The visual indicator, such as the font size, may range from a minimum to a maximum setting (e.g. minimum font size and maximum font size). In some example embodiments, the minimum setting may be used for days having an activity level that is at or below a minimum threshold, and the maximum setting may be used for days that meet or exceed a maximum activity level threshold. For example, if the threshold for the maximum setting is 12 hours of busy time during a day, there may not be a change in the visual indicator displayed for that day if the user is busy during 15 hours or busy during 24 hours. Thus, if the visual indicator is a font size, for example, the font size may reach a maximum size and may not increase if the user is busy during more time than the maximum threshold. The user may still easily assess whether the user has a light day or a busy one, although the visual indicator may have a maximum and minimum setting.

The visual indicator may vary between the maximum and minimum settings for activity levels that are between the maximum and the minimum thresholds. For example, if the visual indicator is the font size of the numerical day, the font size may have a proportional relationship to the activity level for a given day. In one example, the visual indicator is a font size and the font size increases as the amount of busy time during the day increases. However, other relationships between the visual indicator and the calendar data are possible, and example embodiments are not limited to those in which a font size increase is used to indicate that one day is busier than another.

In some example embodiments generating a visual indicator as a function of calendar data comprises generating, for each date in a date range, an index as a function of calendar data. The index may be a numerical value. The calendar data may include, for each of at least one calendar event: at least respective data items indicating a date for the calendar event and a total time occupied by the event. For each date in the date range, the visual indicator is then displayed as a function of the respective index. For example, a range of possible index values may correspond to respective possible visual indicator settings (e.g. font sizes). The index may be generated by use of a table. The table may include a selection of possible indexes and a selection of criteria for each possible index. In an example, the table may indicate that one hour or less busy time corresponds to an index of 1. More than one hour, but less than two hours of busy time may correspond to an index of 2, and so on. Each index may correspond to a particular visual indicator setting or feature (such as a specific font size). For example, an index of 1 may correspond to a 20 point font size. An index of 2 may correspond to a 24 point font size, and so on. As will be apparent to one skilled in the art, various means of generating a visual indicator as a function of calendar data may be implemented, and example embodiments are not limited to the specific examples described herein.

In some example embodiments, the visual indicator may include a conflict indicator that indicates a conflict between two or more of the plurality of calendar events. Conflicts may be determined in various ways. Events that overlap may be designated as conflicting. In some example embodiments, travel time required to reach event locations may be taken into account such that events may conflict even if the actual scheduled times of the events do not overlap. In some example embodiments, one or more events or types of events may not be considered for the purposes of determining whether a conflict exists. For example, events flagged as "all day", "free" and/or "out of office" events may not be considered. In some example embodiments only events flagged as "tentative" or "busy" are considered for determining conflicts. In some example embodiments, the number of participants is not relevant to determining conflicts. For example, events having no participants identified may still be considered. In some example embodiments, events originating from different users' calendars may be considered for determining conflicts. For example, if calendar data for multiple users is consolidated, then the events for different users may be compared to determine whether any conflicts arise.

By using a visual indicator to show conflicts, a user may be able to quickly identify conflicts in their schedule. For example, if one color (e.g. red) is used to indicate a conflict, while another color (e.g. blue) is used to indicate non-conflicting times, a user with a very busy calendar with lots of double-booked meetings may see a lot of the conflict color in the monthly calendar. The user may, therefore, quickly identify that several conflicts are scheduled.

Turning back to the example interface 500 shown in FIGS. 5A and 5B, the interface 500 also includes visual indicators in the form of bars (including bar 522) by each numerical day, the visual indicators being generated as a function of calendar data. The visual indicator in this example is a bar that is filled in depending on how much time during the day is occupied by events. Each bar for each day may give the user a quick indication of how busy the user is that day. In some example embodiments, such indicators may also be used to indicate conflicts between events. An example conflict indicator 540 is shown in FIGS. 5A and 5B. The conflict indicator 540 in FIGS. 5A and 5B is colored a different color (indicated by the diagonal line fill of the indicator 540) than used for the other visual indicator bars. Visual indicators (such as the bars including bar 522) to display an activity or business level are not required, and may be omitted. Also, as described above, visual indicators may have many forms.

Turning again to the example interface 600 shown in FIGS. 6A and 6B, the visual indicator also includes the font size of the numerical days in the displayed portion of the list of dates. As shown, the number "13" in Apr. 13, 2012 has a relatively larger font than other days, which, in this example, indicates that Apr. 13, 2012 has more time occupied by calendar events than the other days of the week. As noted above, the visual indicator (showing an "activity level" of the user) may be omitted. Alternatively, a combination of multiple visual indicators may be used.

Figure 15:
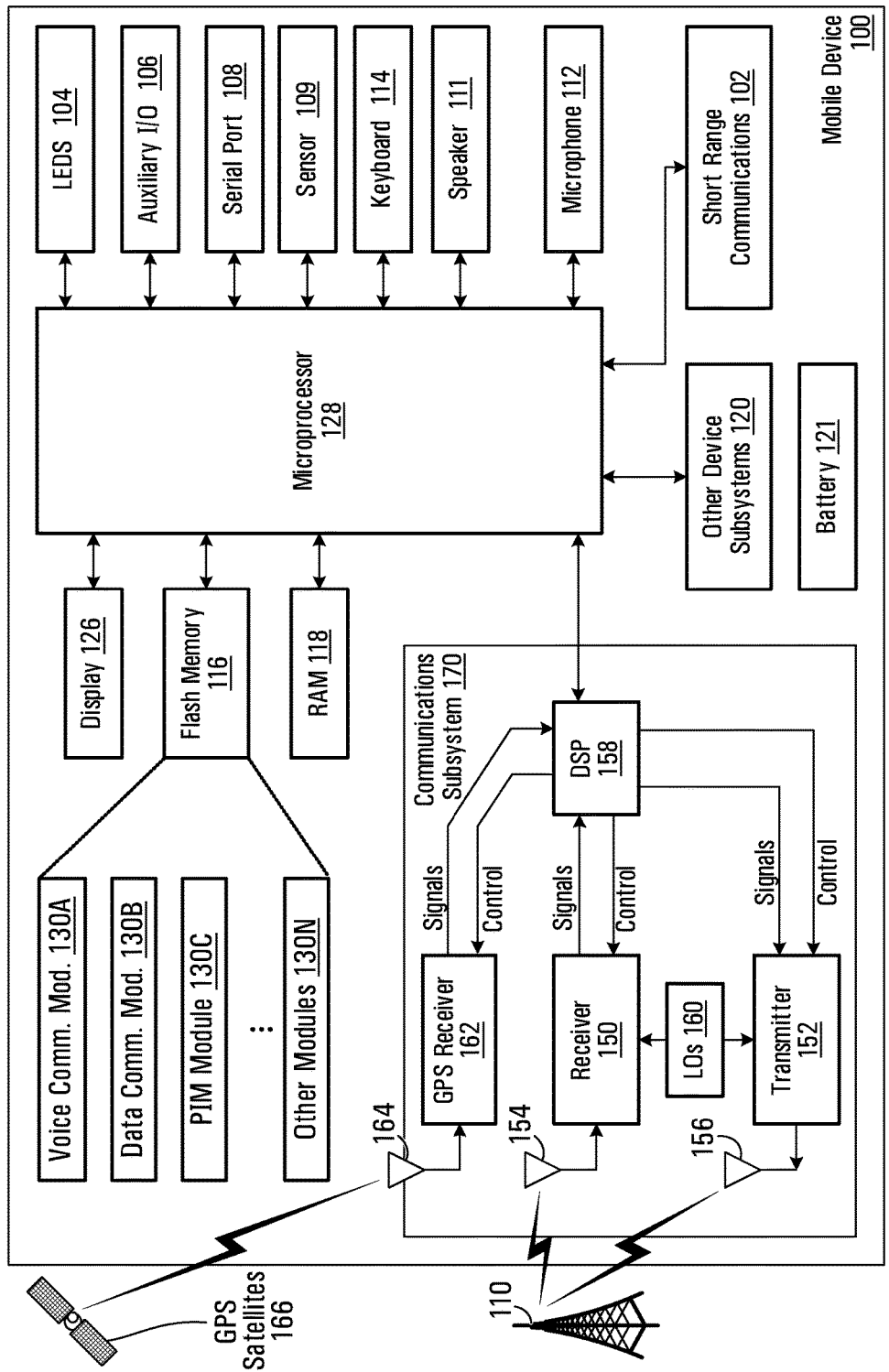
FIG. 15 is a block diagram of an example mobile device.

FIG. 15 shows a block diagram of a mobile device 100 that may implement the methods described herein. The mobile device 100 is shown with specific components for implementing features similar to those of the apparatuses 100, 900, 1200 or 1400 shown in FIG. 1, 9, 12 or 14 respectively. It is to be understood that the mobile device 100 is shown with very specific details for example purposes only.

The mobile device 100 has a housing that may be elongated vertically, or may take on other sizes and shapes (including clamshell housing structures). The keyboard 114 may include a mode selection key, or other hardware or software for switching between text entry and telephony entry. Alternatively, the mobile device 100 may have a housing that does not take on other sizes and shapes.

A microprocessor 128 is shown schematically as coupled between a keyboard 114 and a display 126. The microprocessor 128 is a type of processor with features similar to those of the processors 108, 910, 1212 or 1410 of the apparatuses 400, 900, 1200 or 1400 shown in FIG. 4, 9, 12 or 14 respectively. The microprocessor 128 controls operation of the display 126, as well as overall operation of the mobile device 100, in response to actuation of keys on the keyboard 114 by a user.

In addition to the microprocessor 128, other parts of the mobile device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The mobile device 100 may have a battery 121 to power the active elements of the mobile device 100. The mobile device 100 is in some example embodiments a two-way radio frequency (RF) communication device having voice and data communication capabilities. In addition, the mobile device 100 in some example embodiments has the capability to communicate with other computer systems via the Internet.

Operating system software executed by the microprocessor 128 is in some example embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device 100 may also be stored to the RAM 118.

The microprocessor 128, in addition to its operating system functions, enables execution of software applications on the mobile device 100. A predetermined set of software applications that control basic device operations, such as a voice communications module 130A and a data communications module 130B, may be installed on the mobile device 100 during manufacture. In addition, a personal information manager (PIM) application module 130C may also be installed on the mobile device 100 during manufacture. The PIM application is in some example embodiments capable of organizing and managing data items, such as e-mail, calendar events, voice mails, appointments, and task items. The PIM application is also in some example embodiments capable of sending and receiving data items via a wireless network 110. In some example embodiments, the data items managed by the PIM application are seamlessly integrated, synchronized and updated via the wireless network 110 with the device user's corresponding data items stored or associated with a host computer system.

Additional software modules, illustrated as another software module 130N, may be installed during manufacture. The software modules may include, for example: the calendar application module 106, 905, 1205 or 1405 of FIGS. 1, 9, 12 and 14; the coordination module 107, 906, 1206, or 1406 of FIG. 1, 9, 12 or 14; the list generator 908 or 1208 of FIG. 9 or 12; the threshold monitor 1209 of FIG. 12; the animation module 1210 of FIG. 12; or the visual indicator generator 1408 of FIG. 14. Note that the implementations described with reference to FIG. 15 are very specific for example purposes. For example, alternative implementations are possible in which the information updater is not implemented as software and stored on the flash memory 116. More generally, the information updater may be implemented as software, hardware, firmware, or any appropriate combination thereof.

Communication functions, including data and voice communications, are performed through the communications subsystem 170, and possibly through the short-range communications subsystem 102. The communications subsystem 170 includes a receiver 150, a transmitter 152, a GPS receiver 162, and one or more antennas, illustrated as a receive antenna 154, a transmit antenna 156, and a GPS antenna 164. In addition, the communication subsystem 170 also includes a processing module, such as a digital signal processor (DSP) 158, and local oscillators (LOs) 160.

The specific design and implementation of the communications subsystem 170 is dependent upon the communication network in which the mobile device 100 is intended to operate. For example, the communications subsystem 170 of the mobile device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1X and 1x EV-DO. The communication subsystem 170 may also be designed to operate with an 802.11 Wi-Fi network, or an 802.16 WiMAX network or both. Other types of data and voice networks, both separate and integrated, may also be utilized with the mobile device 100.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150, the transmitter 152, and the GPS receiver 162. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using at least one of the keyboard 114 and some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile device 100. In addition, the display 126 may also be utilized in voice communication mode, for example, to display the identity of a calling party, the duration of a voice call, or other voice call related information.

Location determination using GPS technology involves receiving GPS signals from GPS satellites 166 on the antenna 164. The GPS signals are received using the GPS receiver 162 and processed by the DSP 158. Typically, GPS signals from at least four satellites are processed. Further details of GPS are omitted for simplicity.

The short-range communications subsystem 102 enables communication between the mobile device 100 and other proximate systems or devices, which need not necessarily be similar devices. For example, the short range communications subsystem may include an infrared device and associated circuits and components, or a Bluetooth™ communication module to provide for communication with similarly-enabled systems and devices.

According to some aspects, a computer-readable medium is provided having computer-executable instructions stored thereon that, when executed, cause a computer to implement any one of the methods described herein.

The methods described herein are provided as examples. The various functions of blocks of the method flowcharts shown in the Figures and described above may be performed in different orders than described above. Furthermore, in some example embodiments, various blocks of the methods described above may be omitted. Blocks of different methods that are shown in different figures may also be combined in various combinations in some example embodiments, and the methods are not limited to the blocks shown in each individual figure. For example, the methods shown in FIGS. 3, 8, 10 and 11 may also include block 13-4 of FIG. 13. Other combinations are also possible.

While some specific example embodiments have been described above and illustrated in the accompanying drawings, it will be evident to those skilled in the art that modifications may be made without departing from this disclosure. Such modifications are considered as possible variants included in the scope of the disclosure.

The invention claimed is:

1. A method implemented by a processor comprising:
displaying a first list including calendar event items in a navigable format such that, at least a portion of the first list is displayed as a function of a navigation position of the first list, each calendar event item having a date;
displaying a second list, separate from the displayed first list, the second list including dates in a navigable format such that at least a portion of the second list and a date marker drawing attention to one of the dates in the at least a portion of the second list are displayed as a function of a navigation position of the list of dates, the second list including at least dates in a date range defined by the dates of the calendar event items:
coordinating the navigation position of the first list and the navigation position of the second list by:
adjusting the navigation position of the first list responsive to a navigation performed within the second list such that the navigation position of the first list after adjustment is associated with the position of the date marker after the navigation performed within the second list;
adjusting the navigation position of the second list responsive to a navigation performed within the first list such that the navigation position of the second list after adjustment is associated with the navigation position of the first list after the navigation performed within the first list; and
if the navigation position of the first list exceeds a threshold position for the first list, generating at least one additional calendar event item from the calendar data and adding the additional at least one calendar event item to the first list.

2. The method of claim 1, further comprising:
from calendar data comprising, for each of at least one calendar events, respective data items, generating at least one of:
the first list, each calendar event item corresponding to a respective one of said at least one calendar event; and
the second list.

3. The method of claim 1, wherein navigating the first list comprises at least one of scrolling the first list and swiping the first list.

4. The method of claim 1, wherein navigating the second list comprises at least one of scrolling the second list and swiping the second list.

5. The method of claim 1, wherein each calendar event item in the displayed at least a portion of the first list has a same date.

6. The method of claim 1, wherein coordinating the navigation position of the first list and the navigation position of the second list comprises coordinating the navigation position of the first list and the navigation position of the second list such that the date designated by the date marker is an earliest one of the dates of calendar event items in the displayed at least a portion of the first list.

7. The method of claim 1, wherein displaying the second list in a navigable format comprises displaying the at least a portion of the second list above the displayed at least a portion of the first list.

8. The method of claim 1, further comprising adjusting the threshold position of the first list.

9. The method of claim 1, further comprising, if the navigation position of the second list exceeds a threshold position for the second list, generating at least one additional calendar event item from the calendar data and adding the additional at least one calendar event item to the second list.

10. The method of claim 9, further comprising adjusting the threshold position of the second list.

11. The method of claim 1, further comprising adding at least one date to the second list as a function of the additional at least one calendar event item.

12. The method of claim 1, further comprising, for each date in the displayed at least a portion of the second list, displaying a visual indicator as a function of the calendar data,
the calendar data further comprising, for each of the at least one calendar event, a respective data item indicating a total time occupied by the event.

13. The method of claim 12, wherein the visual indicator comprises, for each date, at least one of: a respective font setting of a respective numerical day, the font setting being determined as a function of the calendar data; and an animation.

14. The method of claim 1, wherein adjusting the navigation position of the list of dates responsive to navigating the first list comprises displaying an animation of a transition of the displayed at least a portion of the second list from a pre-adjusted state to a post-adjusted state.

15. An apparatus comprising:
a display;
an input device;
a processor configured to control the display to display:
a first list including calendar event items in a navigable format such that, at least a portion of the first list is displayed as a function of a navigation position of the first list, each calendar event item having a date; and
a second list, separate from the displayed first list, the second list including dates in a navigable format such that at least a portion of the second list and a date marker drawing attention to one of the dates in the at least a portion of the second list are displayed as a function of a navigation position of the second list, the second list including at least dates in a date range defined by the dates of the calendar event items; and
the processor further configured to coordinate the navigation position of the first list and the navigation position of the second list by:
adjusting the navigation position of the first list responsive to a navigation performed within the second list such that the navigation position of the first list after adjustment is associated with the position of the date marker after the navigation performed within the second list;

adjusting the navigation position of the second list responsive to a navigation performed within the first list such that the navigation position of the second list after adjustment is associated with the navigation position of the first list after the navigation performed within the first list; and if the navigation position of the first list exceeds a threshold position for the first list, generating at least one additional calendar event item from the calendar data and adding the additional at least one calendar event item to the first list.

16. The apparatus of claim 15, further comprising the processor configured to generate, from calendar data comprising respective data items for each of at least one calendar events, at least one of: the first list, each calendar event item corresponding to a respective one of said at least one calendar event; and the second list.

17. The apparatus of claim 15, wherein the processor coordinates the navigation position of the first list and the navigation position of the second list such that the date designated by the date marker is an earliest one of the dates of calendar event items in the displayed at least a portion of the first list.

18. The apparatus of claim 15, wherein the navigable format of the second list is at least one of a scrolling format and a swiping format.

19. The apparatus of claim 15, wherein the navigable format of the first list is at least one of a scrolling format and a swiping format.

20. The apparatus of claim 15, further comprising the processor further configured to generate an animation of a transition of the displayed at least a portion of the second list from a pre-adjusted state to a post-adjusted state.

21. The apparatus of claim 15, wherein, if the navigation position of the second list exceeds a threshold position for the second list, the list generator generates at least one additional calendar event item from the calendar data and adds the additional at least one calendar event item to the first list.

22. The apparatus of claim 15, further comprising a processor configured to, for each date in the displayed at least a portion of the second list, generate a visual indicator as a function of calendar data, the calendar data comprising, for each of at least one calendar event: at least respective data items indicating a date for the calendar event and a total time occupied by the event.

23. An apparatus comprising:
a display;
an input device;
a processor; and
a memory having computer-executable instructions stored thereon that, when executed by the processor, cause the processor to implement a method comprising:
displaying a first list including calendar event items in a navigable format such that, at least a portion of the first list is displayed as a function of a navigation position of the first list, each calendar event item having a date;
displaying a second list, separate from the displayed first list, the second list including dates in a navigable format such that at least a portion of the second list and a date marker drawing attention to one of the dates in the at least a portion of the second list are displayed as a function of a navigation position of the second list, the second list of dates including at least dates in a date range defined by the dates of the calendar event items:
coordinating the navigation position of the first list and the navigation position of the second list by:
adjusting the navigation position of the first list responsive to a navigation performed within the second list such that the navigation position of the first list after adjustment is associated with the position of the date marker after the navigation performed within the second list;
adjusting the navigation position of the second list responsive to a navigation performed within the first list such that the navigation position of the second list after adjustment is associated with the navigation position of the first list after the navigation performed in the first list; and
if the navigation position of the first list exceeds a threshold position for the first list, generating at least one additional calendar event item from the calendar data and adding the additional at least one calendar event item to the first list.

* * * * *